(12) United States Patent
Kanai

(10) Patent No.: US 7,692,721 B2
(45) Date of Patent: Apr. 6, 2010

(54) ELECTRONIC DEVICE HAVING AN EXTERIOR CASING AND A FLAT HARD DISK DRIVE

(75) Inventor: Tsuyoshi Kanai, Tokyo (JP)

(73) Assignee: Sony Corporation, Tokyo (JP)

( * ) Notice: Subject to any disclaimer, the term of this patent is extended or adjusted under 35 U.S.C. 154(b) by 309 days.

(21) Appl. No.: 11/758,916

(22) Filed: Jun. 6, 2007

(65) Prior Publication Data

US 2007/0296834 A1      Dec. 27, 2007

(30) Foreign Application Priority Data

Jun. 8, 2006    (JP)    ............... 2006-159659

(51) Int. Cl.
  *H04N 5/225*    (2006.01)
  *G06F 1/16*     (2006.01)
  *H05K 5/00*     (2006.01)
  *H05K 7/00*     (2006.01)

(52) U.S. Cl. .................. 348/374; 348/376; 386/118; 361/679.37

(58) Field of Classification Search .......... 348/373, 348/374, 375, 376; 386/117, 118, 38, 107; 361/679.33, 679.37
See application file for complete search history.

(56) References Cited

U.S. PATENT DOCUMENTS

| 6,909,456 B1 * | 6/2005 | Sasaki ........................ 348/373 |
| 2005/0182873 A1 * | 8/2005 | Wang et al. ................... 710/74 |
| 2007/0147830 A1 * | 6/2007 | Amatatsu .................... 396/535 |
| 2007/0153120 A1 * | 7/2007 | Kajikawa et al. ........... 348/373 |
| 2008/0019660 A1 * | 1/2008 | Matsumoto ................. 386/46 |

FOREIGN PATENT DOCUMENTS

JP    8-116479    5/1996

\* cited by examiner

*Primary Examiner*—Jason Whipkey
(74) *Attorney, Agent, or Firm*—Oblon, Spivak, McClelland, Maier & Neustadt, L.L.P.

(57) ABSTRACT

An electronic device includes an exterior casing and a flat hard disk drive with a thickness smaller than height and width. The exterior casing includes a hard disk accommodation unit which has a depth corresponding to the thickness and in which the hard disk drive is accommodated, an opening through which the hard disk drive is detachably mounted along the depth direction of the hard disk accommodation unit, and a cover for opening and closing the opening.

18 Claims, 23 Drawing Sheets

ELECTRONIC DEVICE HAVING AN EXTERIOR CASING AND A FLAT HARD DISK DRIVE

BACKGROUND OF THE INVENTION

1. Field of the Invention

The present invention relates to an electronic device provided with a hard disk drive.

2. Description of Related Art

In a field of related art, there are provided electronic devices such as video camera and the like, in which an accommodation unit is provided for accommodating components, such as a switch, etc. in an exterior casing. A cover is provided for opening and closing the accommodation unit (see, for example, Japanese Patent Application Publication No. H08-116479). Further, in the electronic device, the cover constitutes a grip portion to be held by a hand.

SUMMARY OF THE INVENTION

However, since such an electronic device of related art is provided with a hinge for opening and closing the cover and a lock mechanism for locking the cover in a closed state, many components are used, which is disadvantageous in further reducing the size of device.

Further, since the cover is attached to the exterior casing by means of the hinge and lock mechanism, it is also disadvantageous to control rattling produced when the cover constituting a grip is held by hand.

On the other hand, in recent years, electronic devices such as video cameras are provided with a built-in hard disk drive.

In this type of electronic device, when strong shock or vibration is applied to the hard disk drive, there is a possibility that a magnetic disk and a head unit of the hard disk drive may collide with each other and may be damaged. Thus, it is desirable to install the hard disk drive at the final stage in an assembly.

Accordingly, it is possible that the hard disk accommodation unit that accommodates a hard disk drive be provided on the side plane of the exterior casing. The hard disk drive may be accommodated in the hard disk accommodation unit at the final stage in the assembly, and the hard disk accommodation unit may be covered with the cover.

Even in this case, however, as described above, it is possible that the number of components becomes large, causing a disadvantage for reducing the size of devices. Furthermore, another disadvantage may arise in the case of controlling the rattling produced when the cover is held by hand.

Further, in the electronic device provided with the hard disk drive it is thought that the hard disk drive may be replaced with another hard disk drive of a larger data capacity after purchase, or that the hard disk drive may need repair when it is damaged, etc. In such a case, it is preferable that the hard disk drive can be easily detached from the electronic device.

Accordingly, it is desirable to provide an electronic device which is advantageous in reducing the number of components and its physical size, or advantageous in controlling the rattling of the cover, or in which the hard disk drive can be installed at the final stage in the assembly, or the hard disk drive can easily be attached and detached. The present invention has been made in view of the above situation.

According to an embodiment of the present invention, there is provided an electronic device having an exterior casing and a flat hard disk drive with a thickness smaller than height and width. The exterior casing is provided with a hard disk accommodation unit which has a depth corresponding to the thickness and in which the hard disk drive is accommodated, an opening through which the hard disk drive is detachably mounted along the depth direction of the hard disk accommodation unit, and a cover for opening and closing the opening. Furthermore, either the cover or the exterior casing is provided with a first engaging projection which projects in parallel with the depth direction of the hard disk accommodation unit while the opening is closed with the cover, and the other is provided with a first engaging recess which engages with the first engaging projection and prevents the cover from moving in a direction perpendicular to the depth direction of the hard disk accommodation unit while the opening is closed with the cover. Furthermore, either the cover or the exterior casing is provided with a second engaging projection which projects in a direction perpendicular to the depth direction of the hard disk accommodation unit, and the other is provided with a second engaging recess which engages with the second engaging projection and prevents the cover from moving in a direction in parallel with the depth direction of the hard disk accommodation unit while the opening is closed with the cover.

According to another embodiment of the present invention, there is provided an electronic device having an exterior casing and a flat hard disk drive with a thickness smaller than height and width. The exterior casing is provided with a hard disk accommodation unit which has a depth corresponding to the thickness and in which the hard disk drive is accommodated, an opening through which the hard disk drive is detachably mounted along the depth direction of the hard disk accommodation unit, and a cover for opening and closing the opening. The cover is provided with a first engaging projection which projects in parallel with the depth direction of the hard disk accommodation unit while the opening is closed with the cover, and a second engaging projection which projects in a direction perpendicular to the depth direction of the hard disk accommodation unit. Furthermore, the exterior casing is provided with a first engaging recess which engages with the first engaging projection and prevents the cover from moving in a direction perpendicular to the depth direction of the hard disk accommodation unit while the opening is closed with the cover, and a second engaging recess which engages with the second engaging projection and prevents the cover from moving in a direction in parallel with the depth direction of the hard disk accommodation unit.

According to the present invention, the first and second engaging projections are respectively engaged with the first and second engaging recesses, whereby the cover is reliably prevented from moving in the depth direction of the hard disk accommodation unit and in the direction perpendicular to this depth direction, without increasing the number of components. Therefore, in this situation, it becomes possible to attach the cover to the exterior casing simply by means of screws etc., for example. Further, it becomes possible to provide the hard disk accommodation unit at the side plane of the exterior casing etc., thereby enabling installation of the hard disk drive at the final stage in the assembly. Furthermore, it becomes possible to easily attach and detach the hard disk drive.

DETAILED DESCRIPTION OF EMBODIMENTS

Next, embodiments of the present invention will be described with reference to the drawings.

In the embodiments, the description will be carried out with respect to an example where an electronic device is an imaging apparatus.

Figure 1:
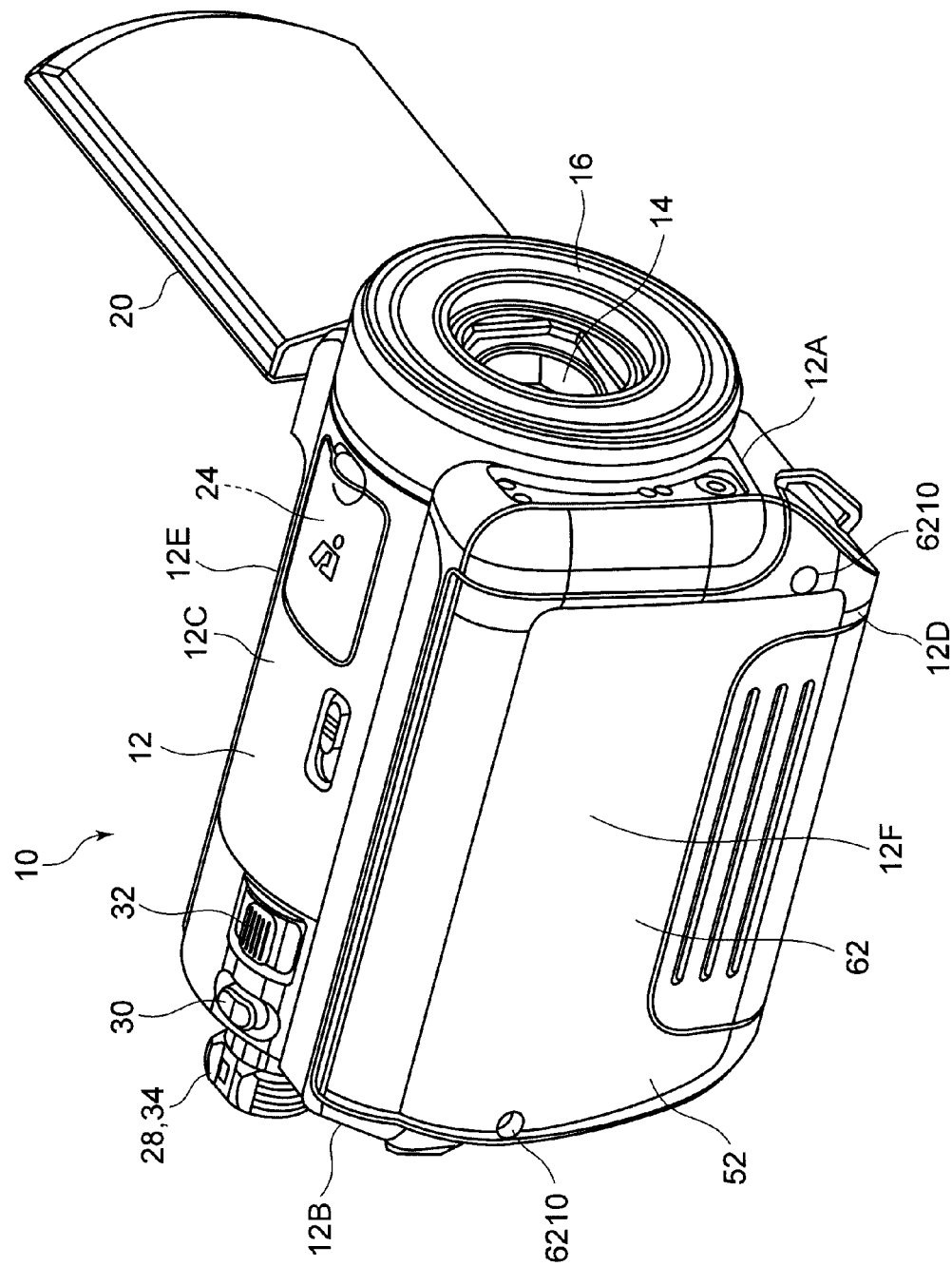
FIG. 1 is a perspective view of an imaging apparatus according to an embodiment of the present invention.
Figure 2:
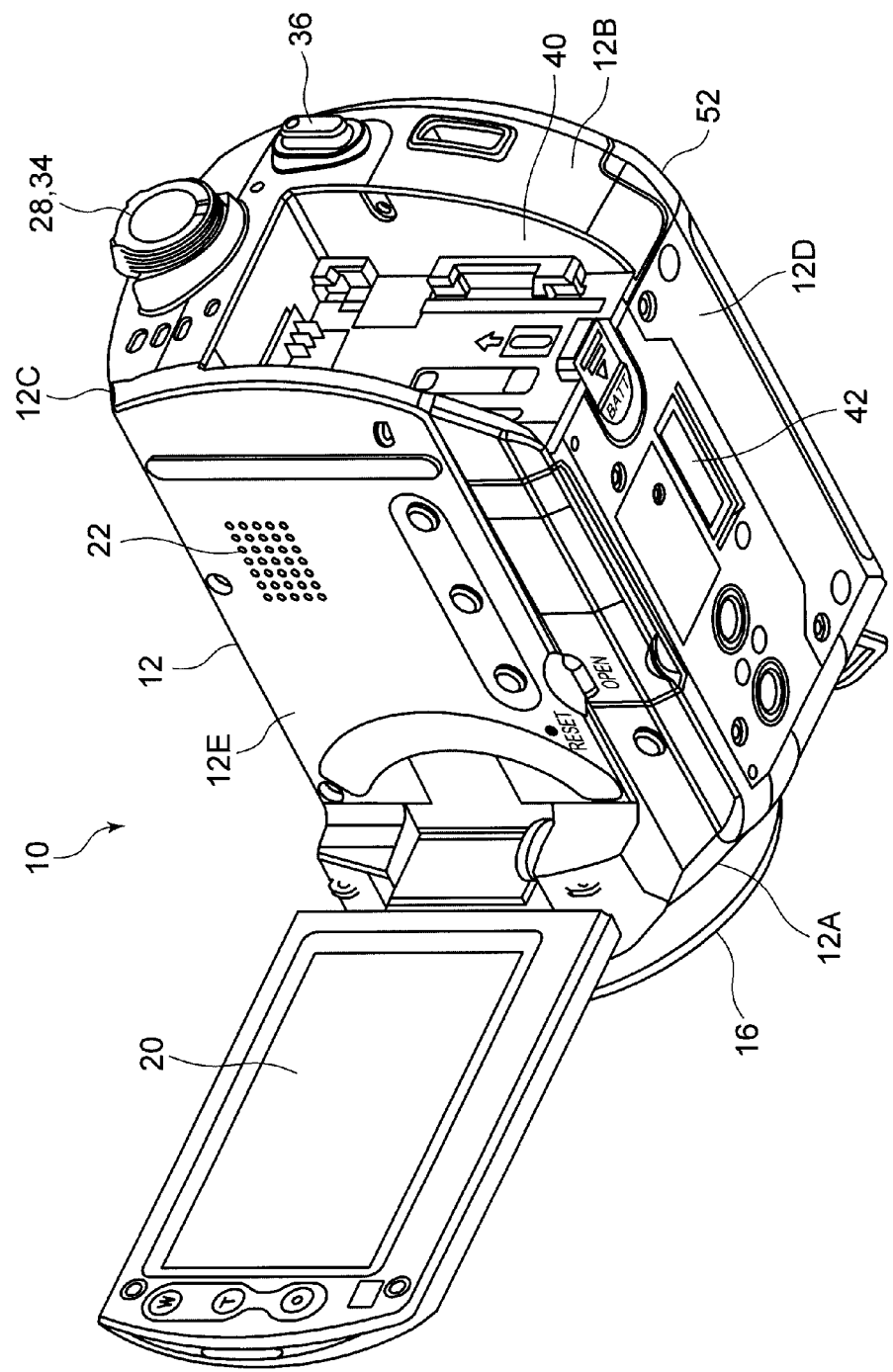
FIG. 2 is a perspective view of the imaging apparatus.
Figure 3:
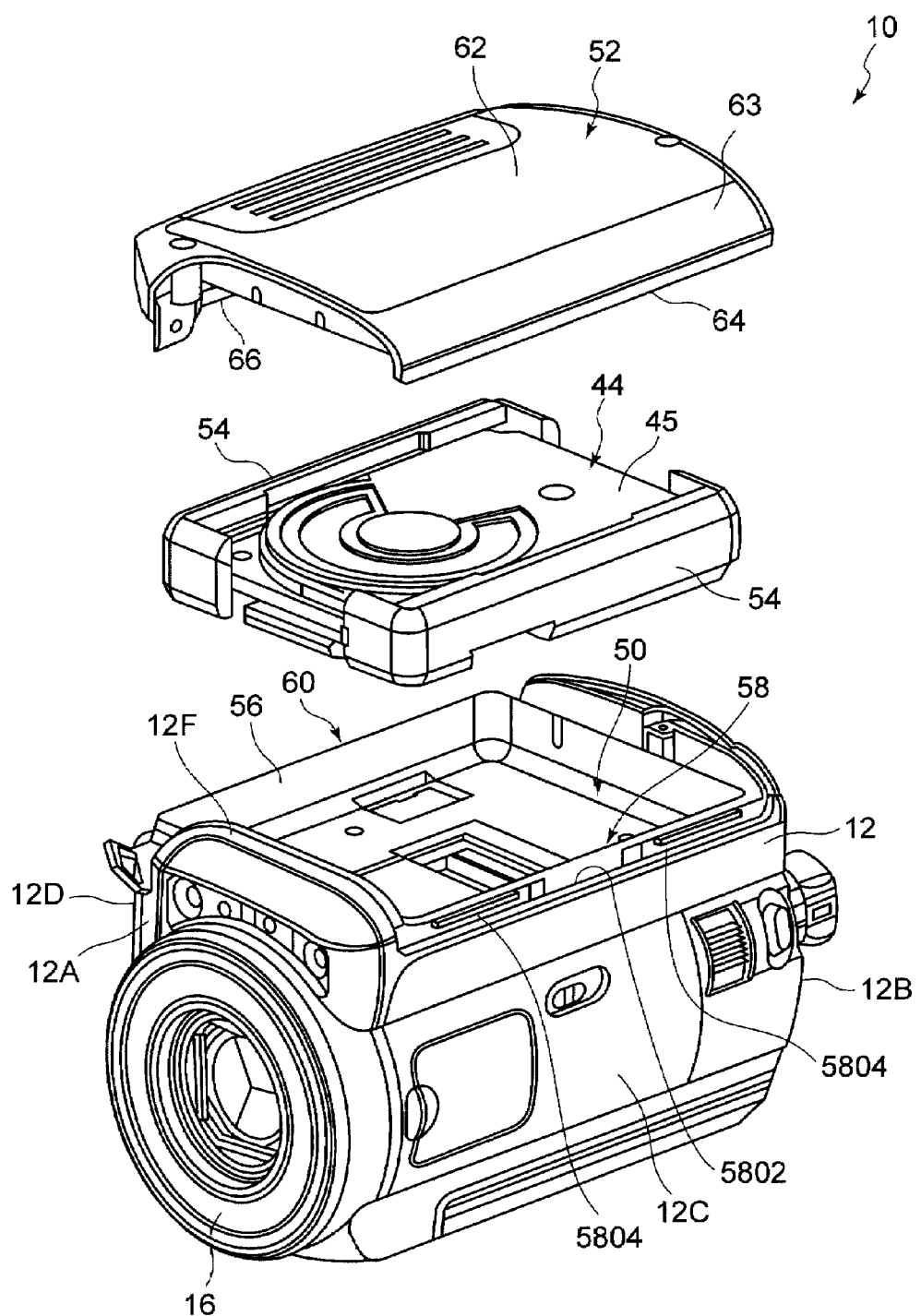
FIG. 3 is an exploded perspective view of the imaging apparatus.
Figure 4:
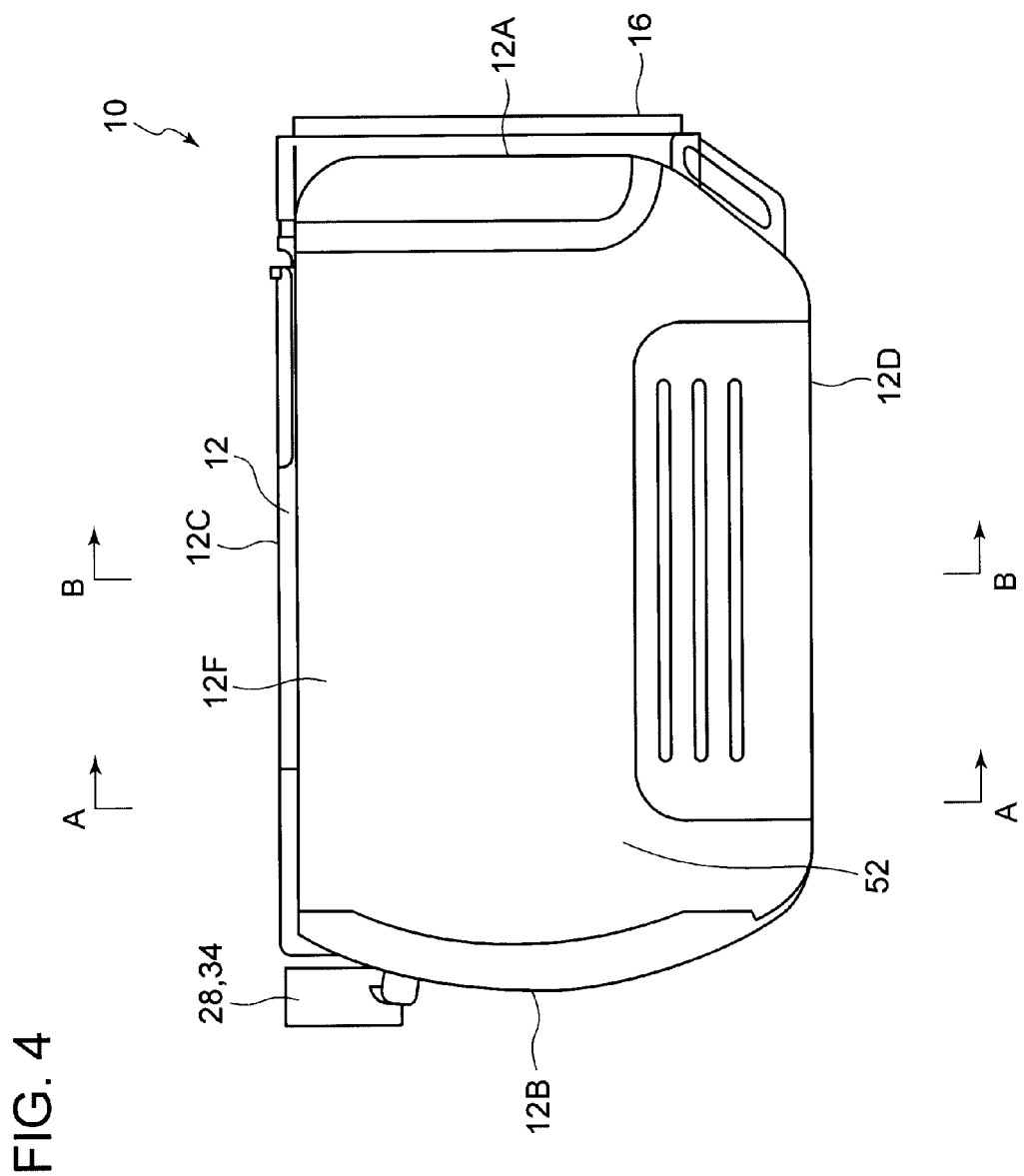
FIG. 4 is a right hand side view of the imaging apparatus.
Figure 5:
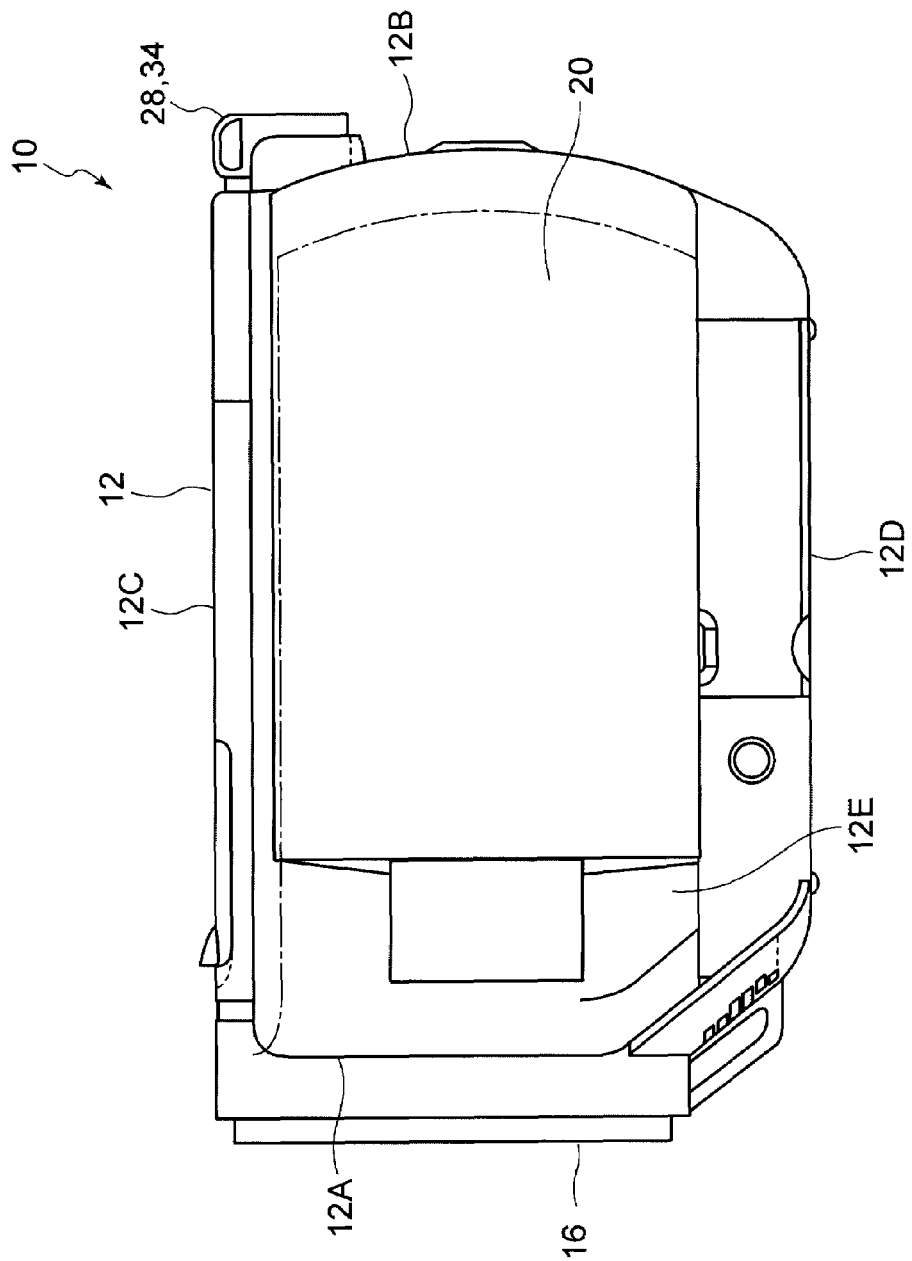
FIG. 5 is a left hand side view of the imaging apparatus.
Figure 6:
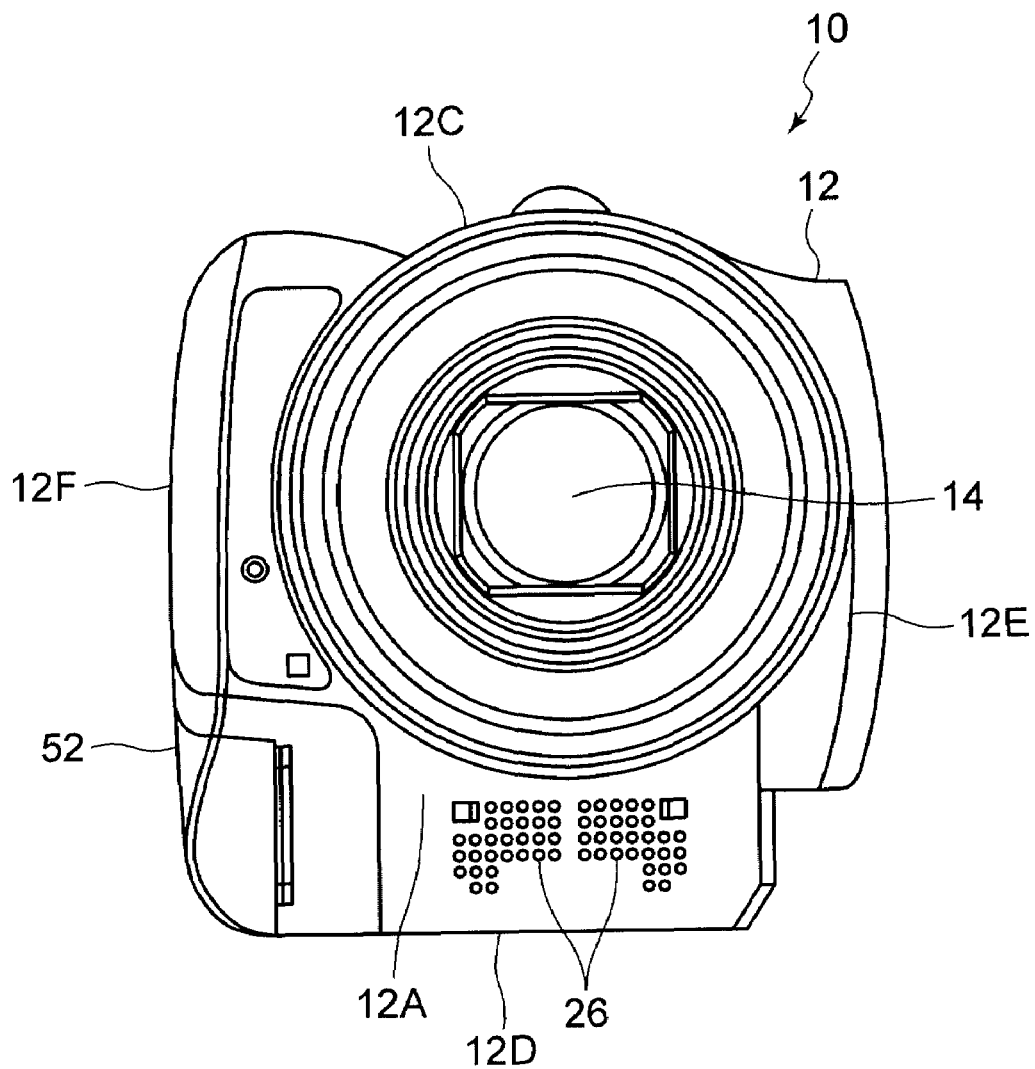
FIG. 6 is a front view of the imaging apparatus.
Figure 7:
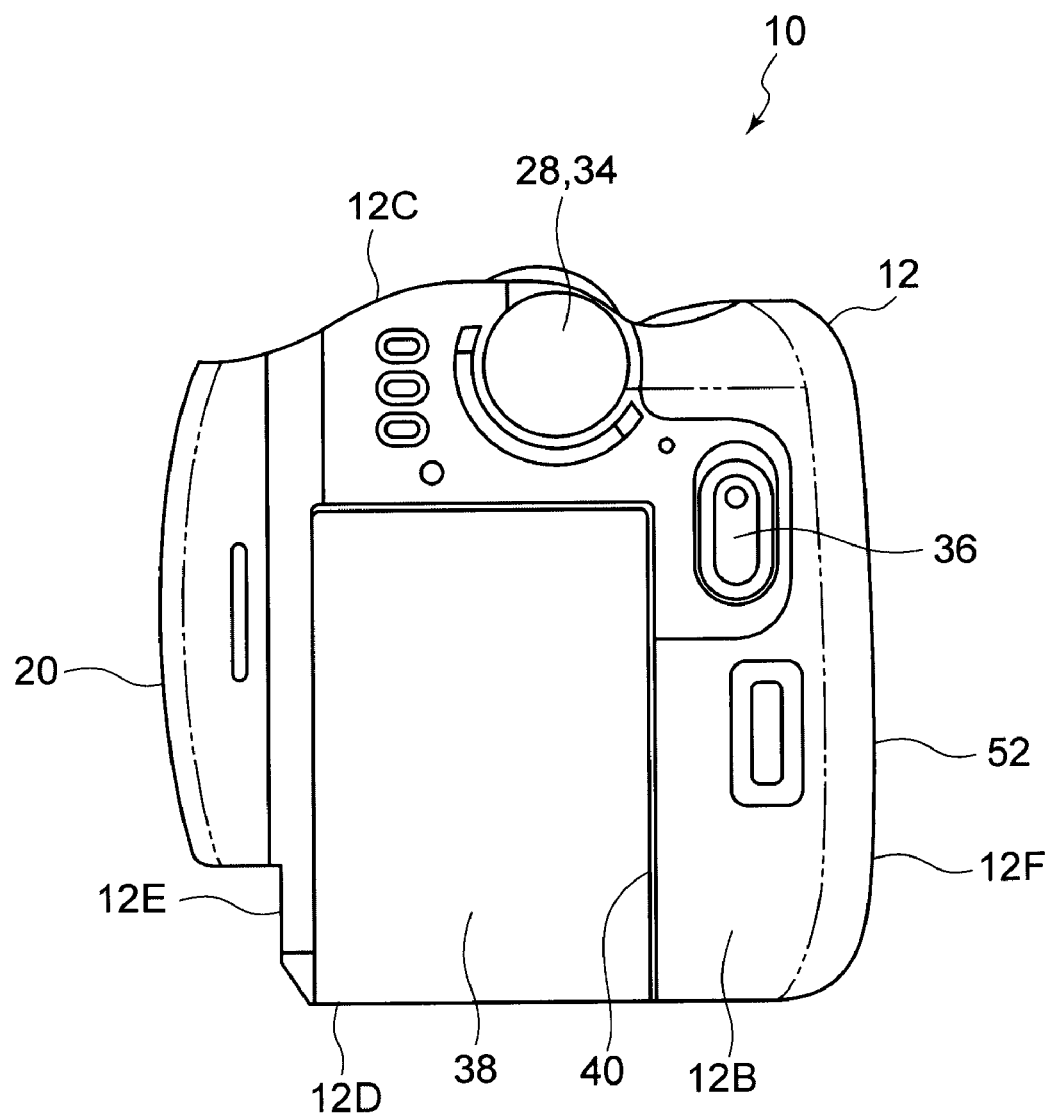
FIG. 7 is a rear view of the imaging apparatus.
Figure 8:
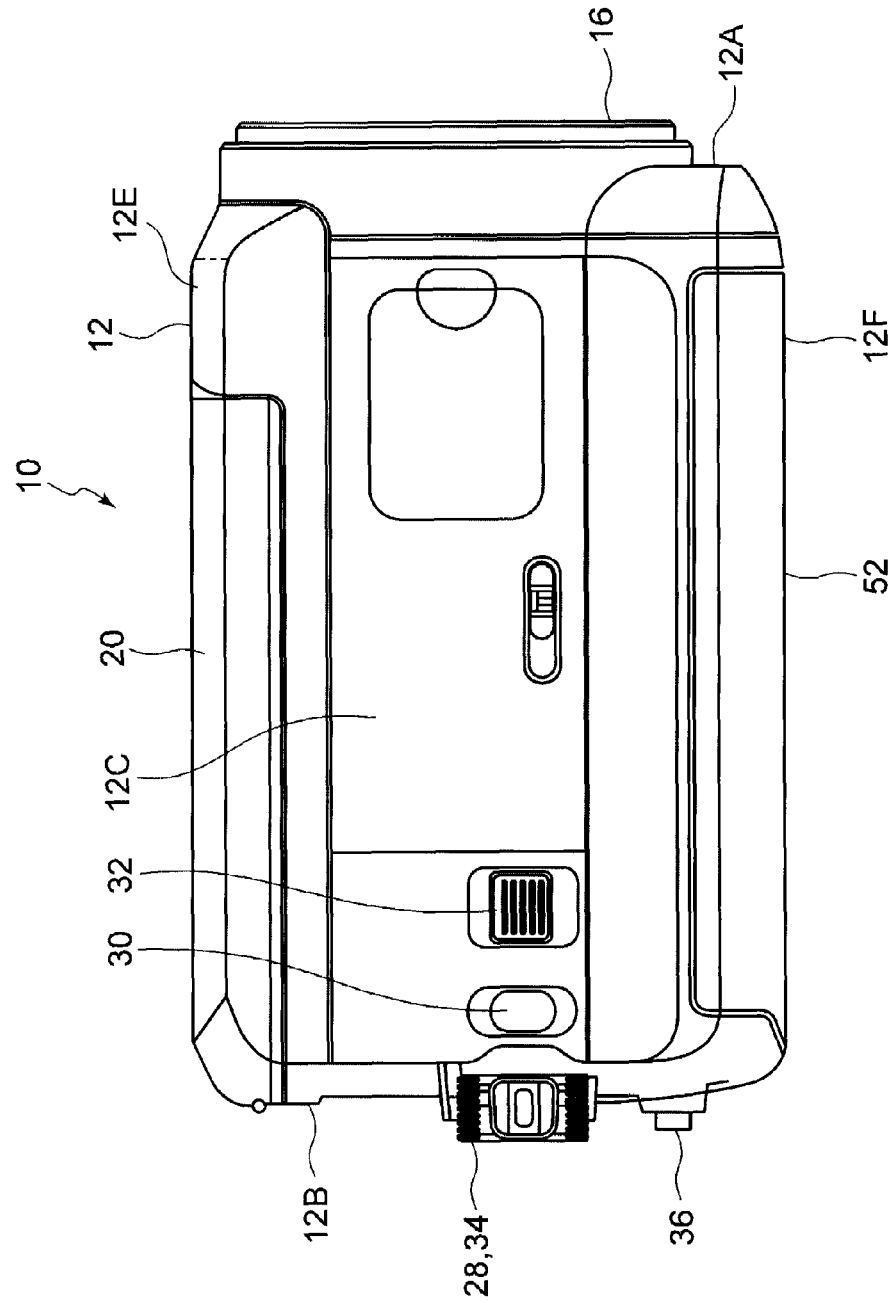
FIG. 8 is a plan view of the imaging apparatus.
Figure 9:
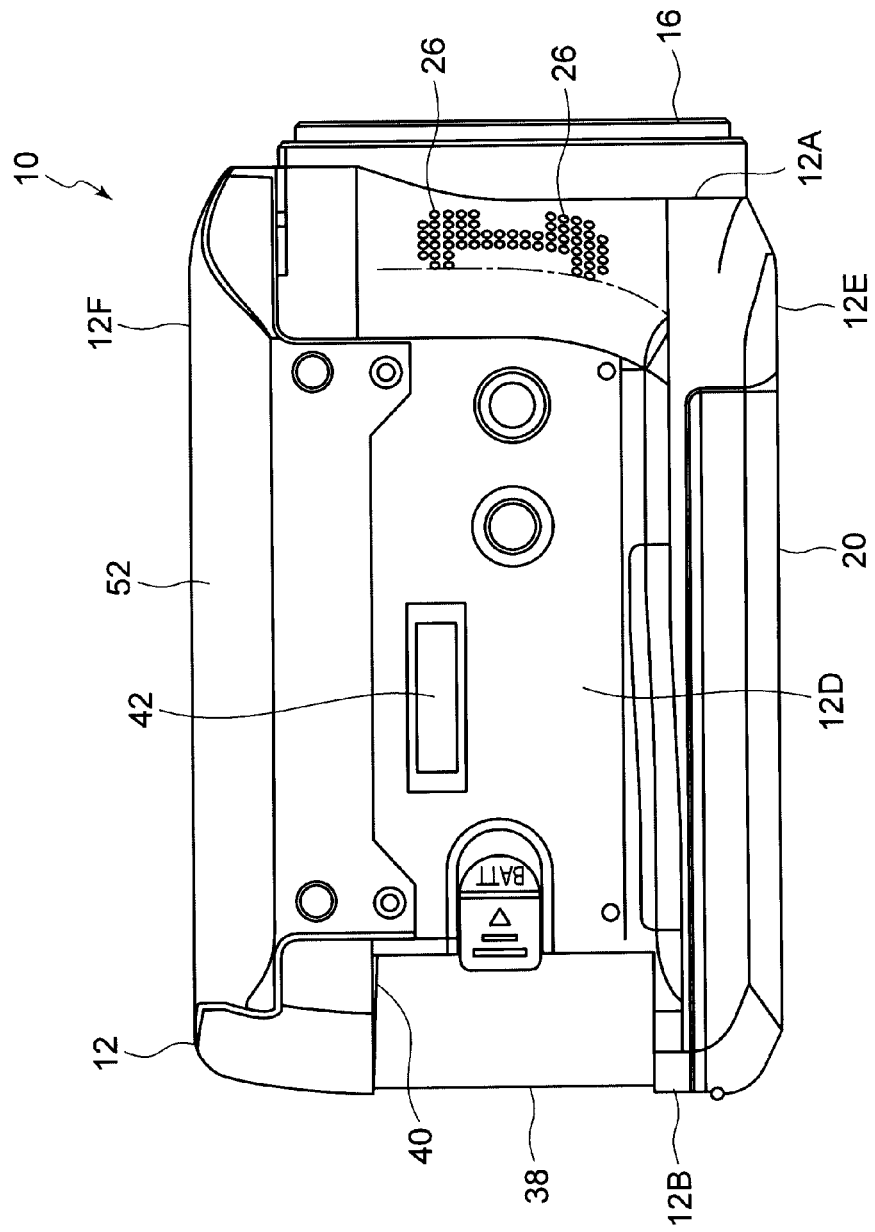
FIG. 9 is a bottom view of the imaging apparatus.

FIGS. 1 and 2 are perspective views of an imaging apparatus 10. FIG. 3 is an exploded perspective view of the imaging apparatus 10. FIG. 4 is a right hand side view of the imaging apparatus 10. FIG. 5 is a left hand side view of the imaging apparatus 10. FIG. 6 is a front view of the imaging apparatus 10. FIG. 7 is a rear view of the imaging apparatus 10. FIG. 8 is a plan view of the imaging apparatus 10. FIG. 9 is a bottom view of the imaging apparatus 10.

Figure 10:
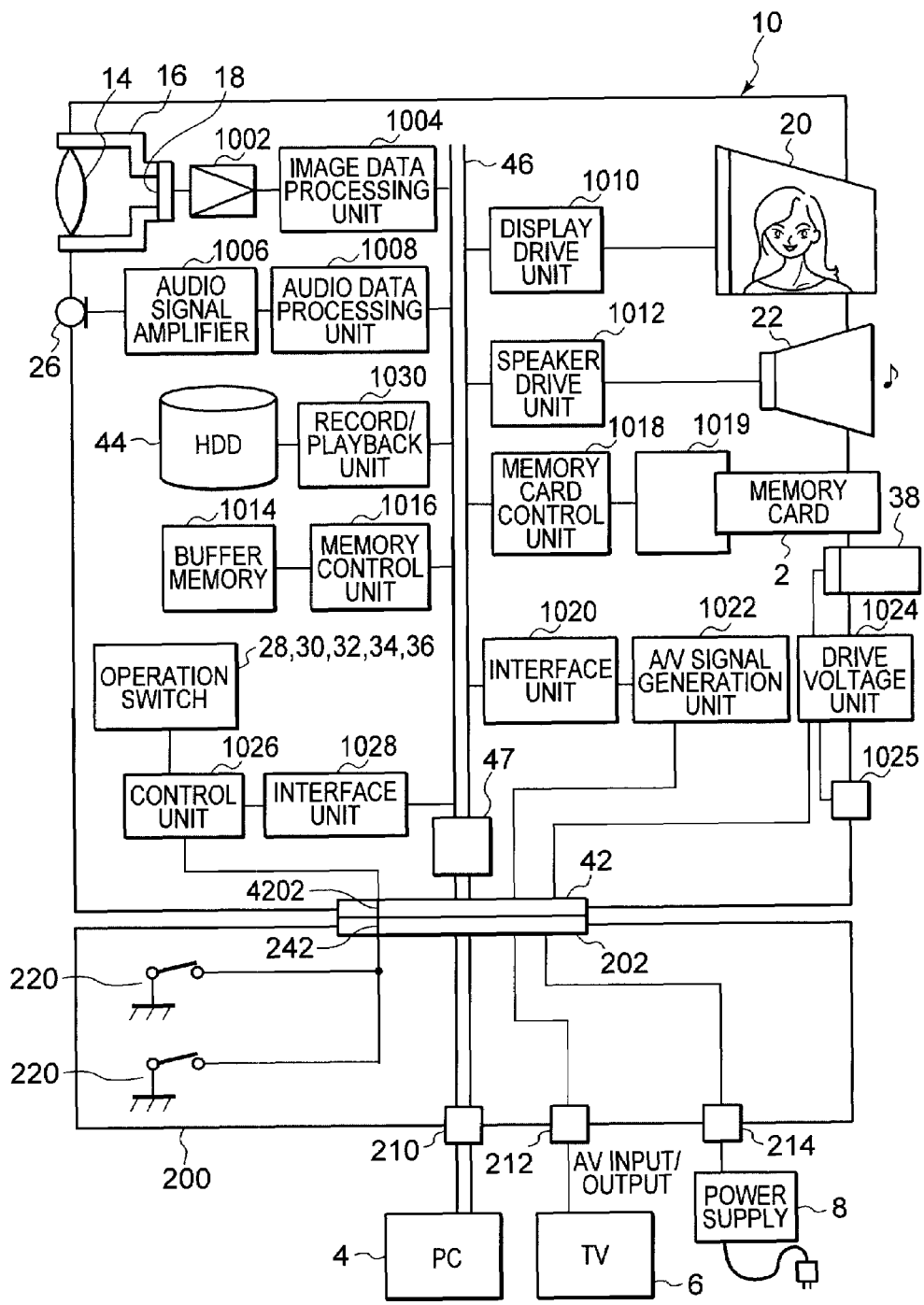
FIG. 10 is a block diagram showing a structure of a control system of the imaging apparatus.

As shown in FIGS. 1 and 2, the imaging apparatus 10 is a video camera, which records and reproduces data, such as animation, a still image, sound, etc., by means of a hard disk drive 44 (see FIGS. 3 and 10).

The imaging apparatus 10 has an exterior casing 12, and the exterior casing 12 has a length in a front-to-back direction which is a size larger than a width in a left/right direction, and a height of an up/down direction. In addition, in this specification, "left/right" is that when the imaging apparatus 10 is seen from back, and an "object side" in the optical axis direction of an optical system is referred to as "front", and an "imaging element side" is referred to as "back".

The exterior casing 12 has a front plane 12A which faces forward, a rear plane 12B which faces rearward, an upper plane 12C which faces upward, a bottom plane 12D which faces downward, a left-hand side plane 12E which faces toward the left-hand side, and a right-hand side plane 12F which faces toward the right-hand side.

A lens barrel 16 having incorporated therein an imaging optical system 14 is provided to extend in the forward/rearward direction at the front of the upper part of the exterior casing 12, such that its front may face the front plane 12A of the exterior casing 12. The imaging optical system 14 has a zoom lens, and is constructed such that its zooming ratio can be varied continuously.

An imaging element 18 (see FIG. 10) for taking an object image derived by the imaging optical system 14 is formed in the back end of the lens-barrel 16.

As shown in FIGS. 1 and 2, a display panel 20 which is, for example, a liquid crystal display apparatus in order to display the object image etc. taken by the imaging element 18 is provided on the left-hand side part of the exterior casing 12 to be openable and closable. When this display panel 20 is closed, it is set on the left-hand side plane 12E of the exterior casing 12. In addition, a speaker 22 is provided at the left-hand side plane 12E of the exterior casing 12.

As shown in FIG. 1, a hot shoe 24 in which accessories, such as a video light and a flash light, can be detachably mounted is provided at the front of the upper plane 12C of the exterior casing 12.

As shown in FIGS. 2, 7, and 9, a battery mounting unit 40 for mounting a battery 38 is provided at the rear plane 12B of the exterior casing 12.

As shown in FIGS. 2 and 9, a multiple connector 42 is provided at the bottom plane 12D of the exterior casing 12. As shown in FIG. 10, the multiple connector 42 is connected to a multiple connector 202 on a cradle 200 side, when the imaging apparatus 10 is set in the cradle 200.

As shown in FIG. 6, a microphone 26 for collecting a sound is provided at the lower part of the front plane 12A of the exterior casing 12.

As shown in FIGS. 1 and 2, the imaging apparatus 10 is provided with an power supply operation switch 28, a still image taking operation switch 30, a zoom operation switch 32, a mode switching operation switch 34, a moving image taking operation switch 36, etc. as operation switches for performing the various functions related to imaging.

The power supply operation switch 28, the still image taking operation switch 30, the zoom operation switch 32, and the mode switching operation switch 34 are provided at the upper plane 12C of the exterior casing 12.

The moving image taking operation switch 36 is provided at a position near the right-hand side plane 12F intermediate between the top and bottom of the rear plane 12B of the exterior casing 12.

The power supply operation switch 28 is for turning ON/OFF the power supply of the imaging apparatus 10.

The still image taking operation switch 30 is for taking a still image with the imaging element 18.

The zoom operation switch 32 is for changing the zooming ratio of the imaging optical system 14.

The mode switching operation switch 34 is for switching between a still image taking mode and a moving image taking mode.

The moving image taking operation switch 36 is for starting and stopping acquisition of the moving image.

FIG. 10 is a block diagram showing a structure of a control system of the imaging apparatus 10.

As shown in FIG. 10, the imaging apparatus 10 is provided with a video signal amplifier 1002, an image data processing unit 1004, an audio signal amplifier 1006, an audio data processing unit 1008, a display drive unit 1010, a speaker drive unit 1012, a buffer memory 1014, a memory control unit 1016, a memory card control unit 1018, an interface unit 1020, an A/V signal generation unit 1022, a drive voltage unit 1024, a control unit 1026, an interface unit 1028, a record/playback unit 1030, the hard disk drive 44, a bus 46, a USB interface unit 47, etc.

The image data processing unit 1004, the audio data processing unit 1008, the display drive unit 1010, the speaker drive unit 1012, the memory control unit 1016, the memory card control unit 1018, the interface unit 1020, the interface unit 1028, and the record/playback unit 1030 are connected to the bus 46.

An image signal generated with the imaging element 18 is amplified in the video signal amplifier 1002, and is supplied to the image data processing unit 1004.

The image data processing unit 1004 carries out a predetermined signal process for the image signal, and generates moving image data and still image data to be supplied to the record/playback unit 1030.

The audio signal collected with the microphone 26 is amplified in the audio signal amplifier 1006, and subjected to a predetermined signal process by means of the audio data processing unit 1008, to be supplied to the record/playback unit 1030 as audio data.

The record/playback unit 1030 supplies the moving image data and still image data supplied from the image data processing unit 1004 or the audio data supplied from the audio data processing unit 1008, to the record/playback unit 1030 under the to control of the control unit 1026. The record/playback unit 1030 records the moving image data and the still image data or the audio data on the hard disk drive 44.

Further, the record/playback unit 1030 records the moving image data and the still image data supplied from the image data processing unit 1004 or the audio data supplied from the audio data processing unit 1008 through the memory card control unit 1018 on a memory card 2 as a recording medium inserted in a memory card slot 1019 for memory cards.

Further, the record/playback unit 1030 supplies the moving image data and still image data supplied from the image data processing unit 1004 to the display panel 20 through the display drive unit 1010, and causes it to display an image.

Furthermore, the record/playback unit 1030 supplies the moving image data and the still image data supplied from the memory card 2 through the memory card control unit 1018, to the display panel 20 through the display drive unit 1010 and causes it to display an image. It also supplies the audio data supplied from the memory card 2 through the memory card control unit 1018, to the speaker 22 through the speaker drive unit 1012, and causes it to output a sound.

Still further, the record/playback unit 1030 supplies the moving image data and the still image data reproduced from the hard disk drive 44 to the display panel 20 through the display drive unit 1010 and causes it to display an image. It also supplies the audio data reproduced from the hard disk drive 44 to the speaker 22 through the speaker drive unit 1012, and causes it to output a sound.

The buffer memory 1014 is one that reads and writes data including image data or audio data through the memory control circuit 1016 and the bus 46.

The control unit 1026 turns ON/OFF the power supply of the imaging apparatus 10, by way of operation of the power supply operation switch 28.

Further, the control unit 1026 issues instructions to the image data processing unit 1004 and the record/playback unit 1030 based on operation of the still image taking operation switch 30, and supplies the still image data supplied from the image data processing unit 1004 to the record/playback unit 1030, to thereby cause the still image data to be recorded on the hard disk drive 44.

Furthermore, the control unit 1026 issues instructions to a zoom drive unit (not shown in the figure) based on operation of the zoom operation switch 32, and moves the zoom lens of the imaging optical system 14, to thereby change the zooming ratio of the imaging optical system 14.

Still further, the control unit 1026 issues instructions to the image data processing unit 1004 based on operation of the mode switching operation switch 34, to thereby switch between the moving image taking mode in which the image data processing unit 1004 is caused to generate moving image data and the still image taking mode in which the image data processing unit 1004 is caused to generate still image data.

In addition, in the moving image taking mode, the moving image data generated in the image data processing unit 1004 is recorded on the hard disk drive 44 or the memory card 2 through the record/playback unit 1030. In the still image taking mode, the still image data generated in the image data processing unit 1004 is recorded on the hard disk drive 44 or the memory card 2 through the record/playback unit 1030.

Further, the control unit 1026 starts recording of the moving image data, and stops the recording based on operation of the moving image taking operation switch 36. In other words, the control unit 1026 issues instructions to the image data processing unit 1004 and the record/playback unit 1030 based on the operation of the moving image taking operation switch 36, and causes them to start operation of recording on the hard disk drive 44 the moving image data supplied from the image data processing unit 1004 to the record/playback unit 1030, or to stop the operation. In the present embodiment, the control unit 1026 is constituted by a microcomputer (including a general-purpose microprocessor or a general-purpose DSP).

In addition, in the present embodiment, the signal processing unit in claims is constituted by the video signal amplifier 1002, the image data processing unit 1004, the control unit 1026, the record/playback unit 1030, etc.

Further, the A/V signal generation unit 1022 converts the moving image (still image) data and audio data which are supplied from the record/playback unit 1030 or the memory card control unit 1018 through the interface unit 1020 into predetermined image signal and audio signal to be outputted.

Furthermore, the drive voltage unit 1024 adjusts the electric power supplied from the battery 38 to predetermined voltage and current which are supplied to each part of the imaging apparatus 10, or adjusts the electric power supplied from an external power source through an external power supply input terminal 1025 to predetermined voltage and current which are supplied to each part of the imaging apparatus 10.

Still further, the battery 38 is charged with the electric power supplied from the external power source.

The USB interface unit 47 is provided between the bus 46 and the multiple connector 42, and performs data communication by means of USB between the bus 46 and an external device through the multiple connector 42 and the cradle 200 based on the instructions of the control unit 1026.

In other words, the imaging apparatus 10 is arranged to be placed in the cradle 200 such that it may communicate with the external device.

The cradle 200 is a base on which the imaging apparatus 10 is set, and has a data communication connector 210 to which a bus of a personal computer 4 is connected via a cable, an A/V connector 212 to which an image input terminal and an audio input terminal of a TV set 6 are connected via an A/V cable, an external power supply terminal 214 to which an external power supply 8 is connected, etc.

Each of these connectors 210, 212, and 214 is electrically connected to the multiple connector 202.

Therefore, when the imaging apparatus 10 is set in the cradle 200 and the multiple connectors 42 and 202 are connected together, the video signal and the audio signal outputted from the A/V signal generation unit 1022 are supplied to the external TV set 6 connected to the A/V connector 212 of the cradle 200.

Further, in the situation where the imaging apparatus 10 is set in the cradle 200 and the multiple connectors 42 and 202 are connected together, the electric power from the external power supply 8 connected to the external power supply terminal 214 of the cradle 200 is supplied to the drive voltage unit 1024 through the multiple connectors 202 and 42, whereby the drive voltage unit 1024 adjusts the supplied electric power to predetermined voltage and current, and supplies them to each part of the imaging apparatus 10, or charges the battery 38.

Further, in the situation where the imaging apparatus 10 is set in the cradle 200 and the multiple connectors 42 and 202 are connected together, the USB interface unit 47 is connected with the bus of the personal computer 4 which is connected to the data communication connector 210 of the cradle 200, such that the control unit 1026 and the personal computer 4 can carry out data communication.

Furthermore, one or a plurality of switches 220 one end of which is connected to the ground and the other end of which is connected to a terminal 242 of the multiple connector 202 are provided for the cradle 200.

A terminal 4202 of the multiple connector 42 of the imaging apparatus 10 corresponding to the terminal 242 of the multiple connector 202 connected to the other end of a switch 220 is connected to the control unit 1026.

Therefore, when the switch 220 is operated in the situation where the imaging apparatus 10 is set in the cradle 200 and the multiple connectors 42 and 202 are connected together, a signal of L level is detected in the control unit 1026 through terminals 242 and 4202.

By controlling the USB interface unit 47 based on detection of the signal of L level, the control unit 1026 performs predetermined data communication by means of USB between the imaging apparatus 10 (electronic device) and the personal computers 4 (external device) through the USB interface unit 47.

The predetermined data communication is an operation to transfer the image data and the audio data which are recorded on the hard disk drive 44 as a recording medium, for example, to the personal computer 4, that is an operation to back up the data.

The personal computer 4 backs up and records the transferred data in the hard disk drive of the personal computer 4.

Alternatively, by means of an optical disc drive provided therein, the personal computer 4 backs up the transferred data by writing them in optical discs, such as DVD-R etc.

Thus, only by operating the operation switch 220, the image data and the audio data which are recorded in the imaging apparatus 10 can be backed up easily in the hard disk drive or the optical disc of the personal computer 4, and it has an advantage that it can cope with disappearance of the data due to failure of the hard disk drive 44 of the imaging apparatus 10 etc.

Next, the hard disk drive 44 and its accommodation structure will be described in detail.

Figure 11:
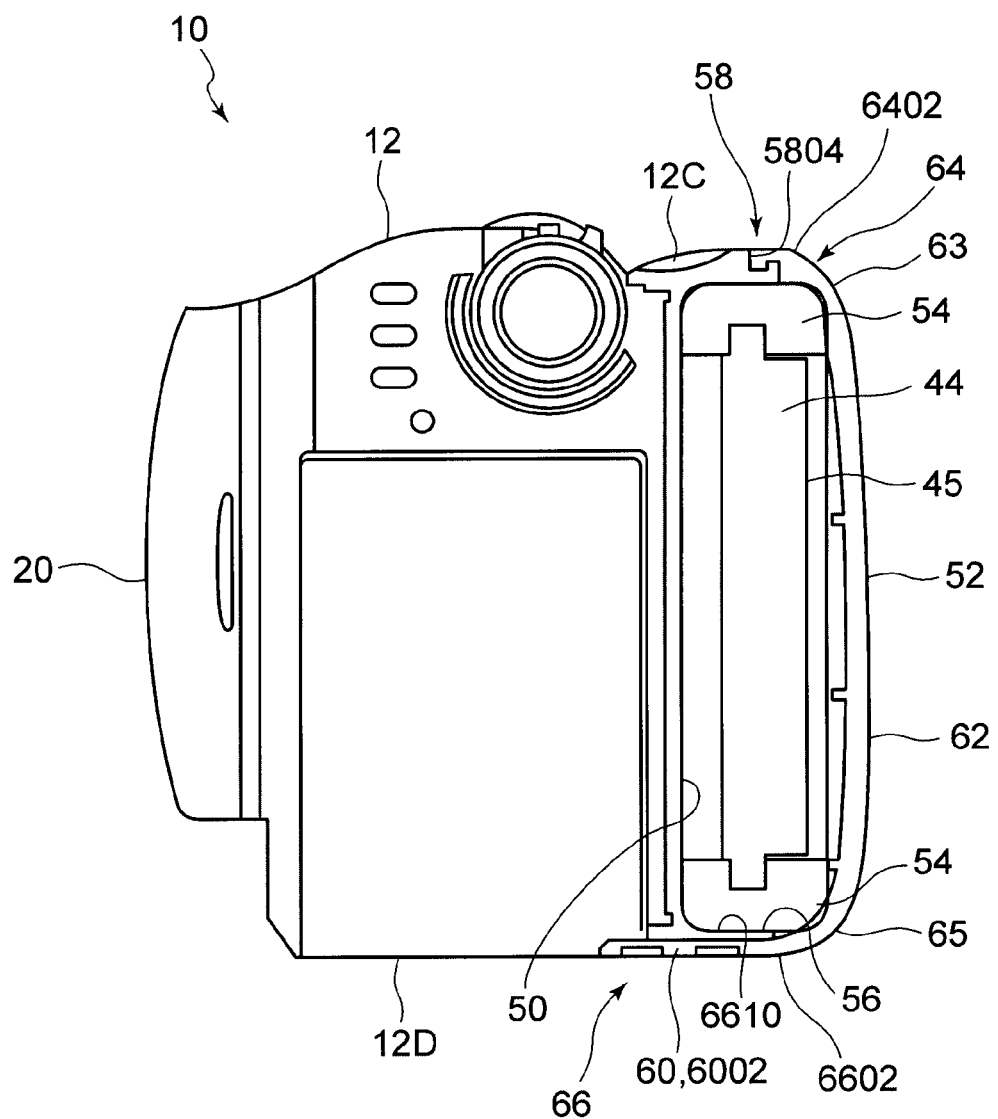
FIG. 11 is a sectional view partly taken along line AA in FIG. 4.
Figure 12:
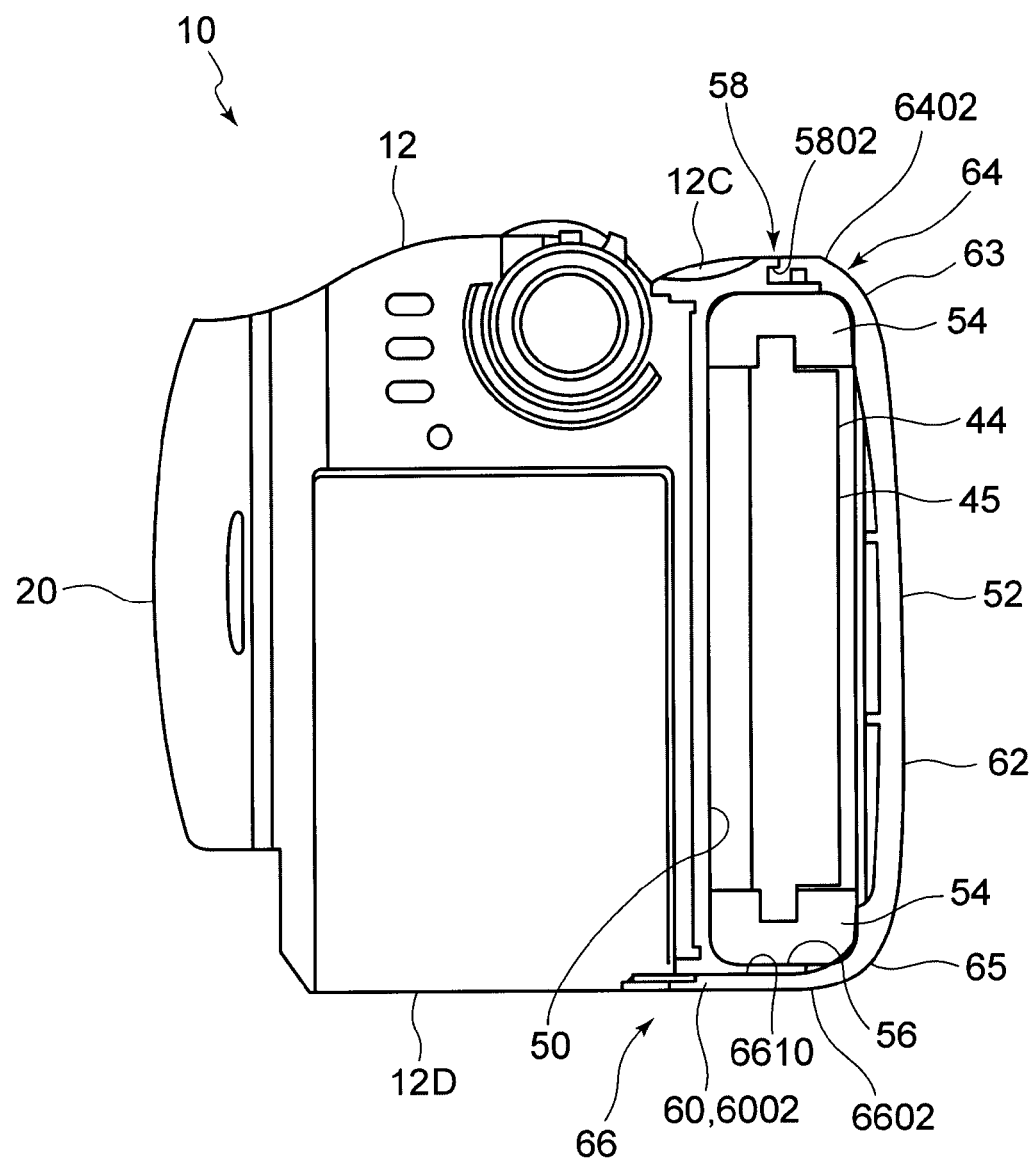
FIG. 12 is a sectional view partly taken along line BB in FIG. 4.
Figure 13:
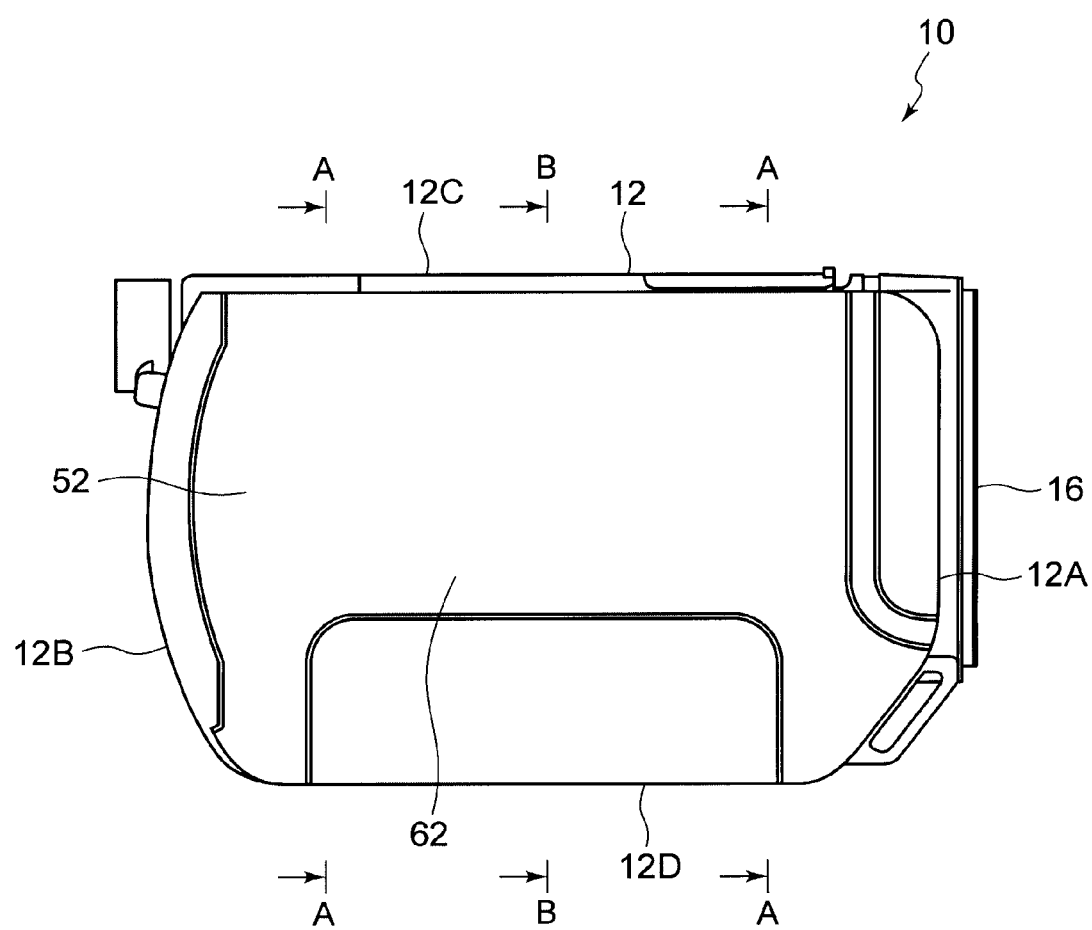
FIG. 13 is a right hand side view of the imaging apparatus.
Figure 14:
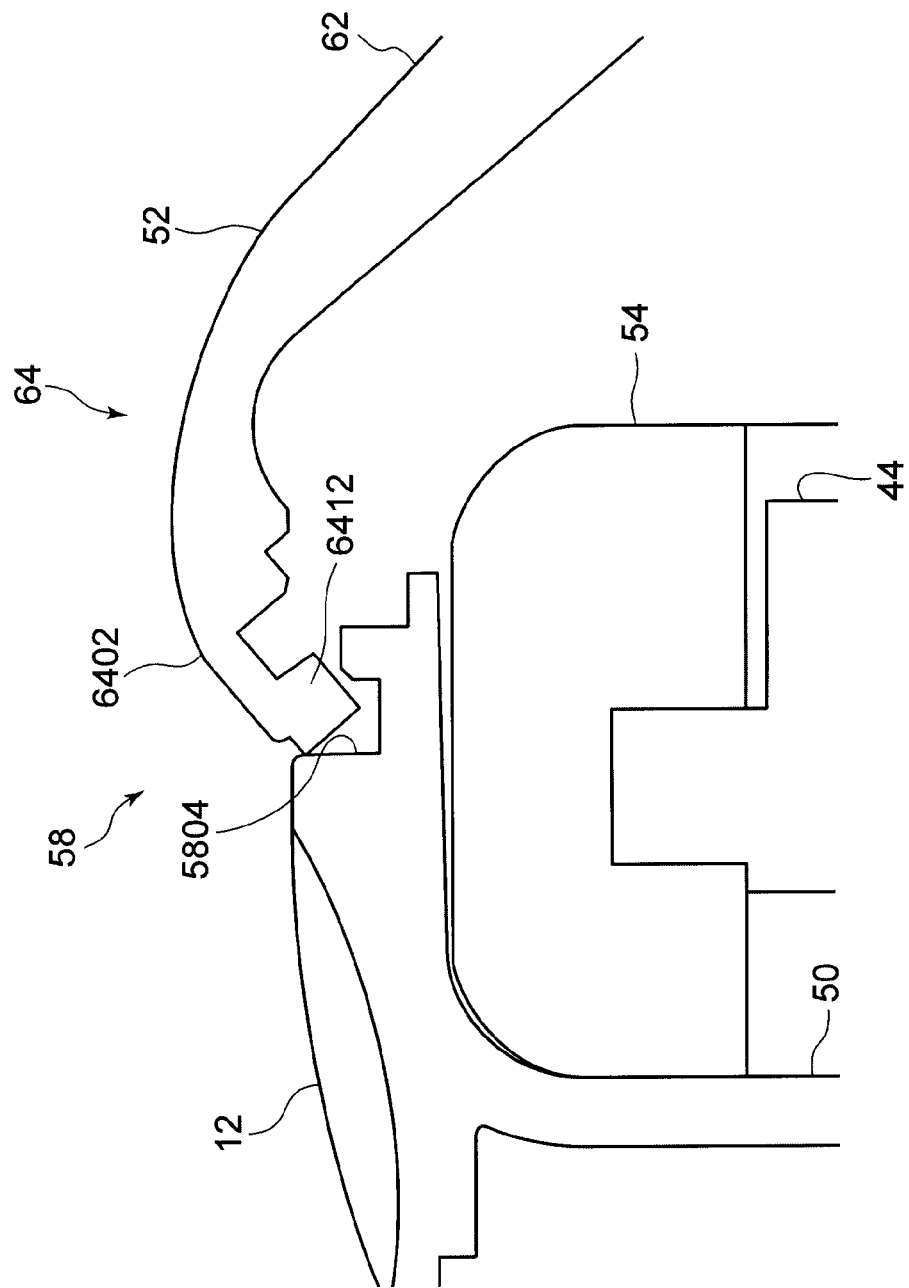
FIG. 14 is a diagram for explaining a mounting step of a cover according to an embodiment of the present invention at a section taken along line AA in FIG. 13.
Figure 15:
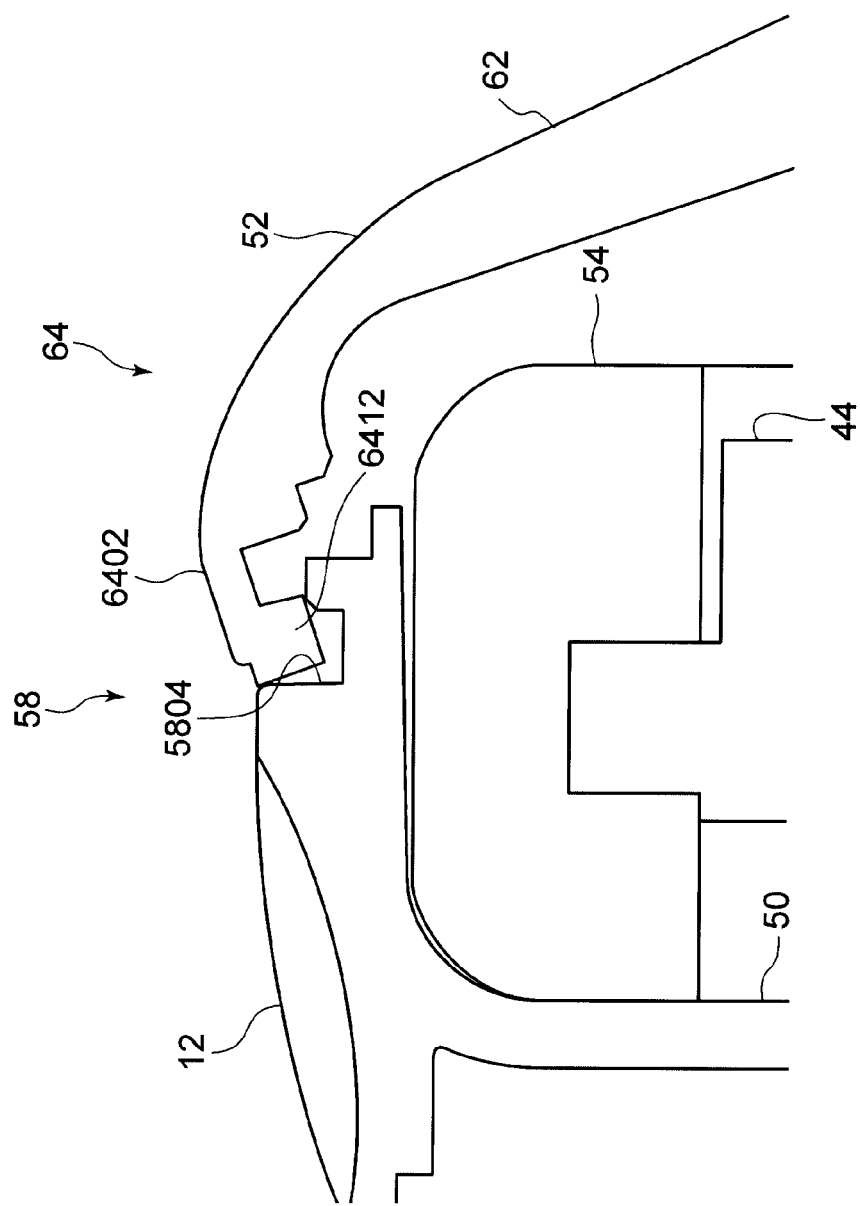
FIG. 15 is a diagram for explaining the mounting step of the cover at the section taken along line AA in FIG. 13.
Figure 16:
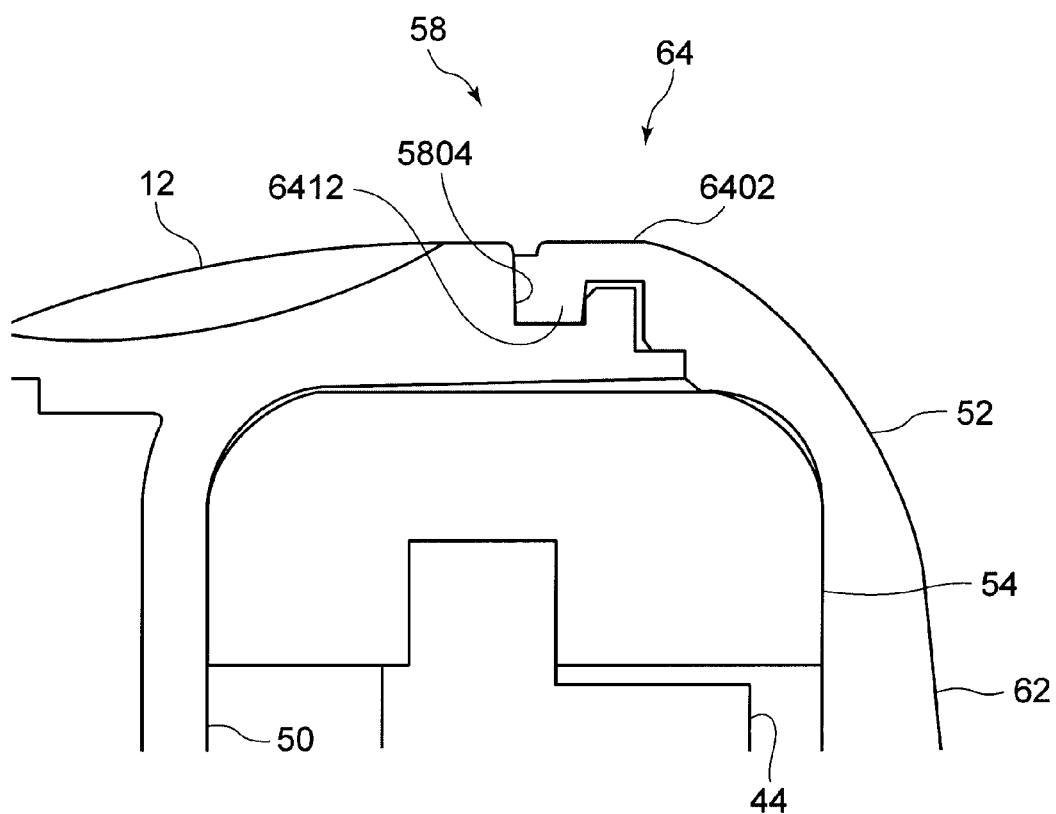
FIG. 16 is a diagram for explaining the mounting step of the cover at the section taken along line AA in FIG. 13.
Figure 17:
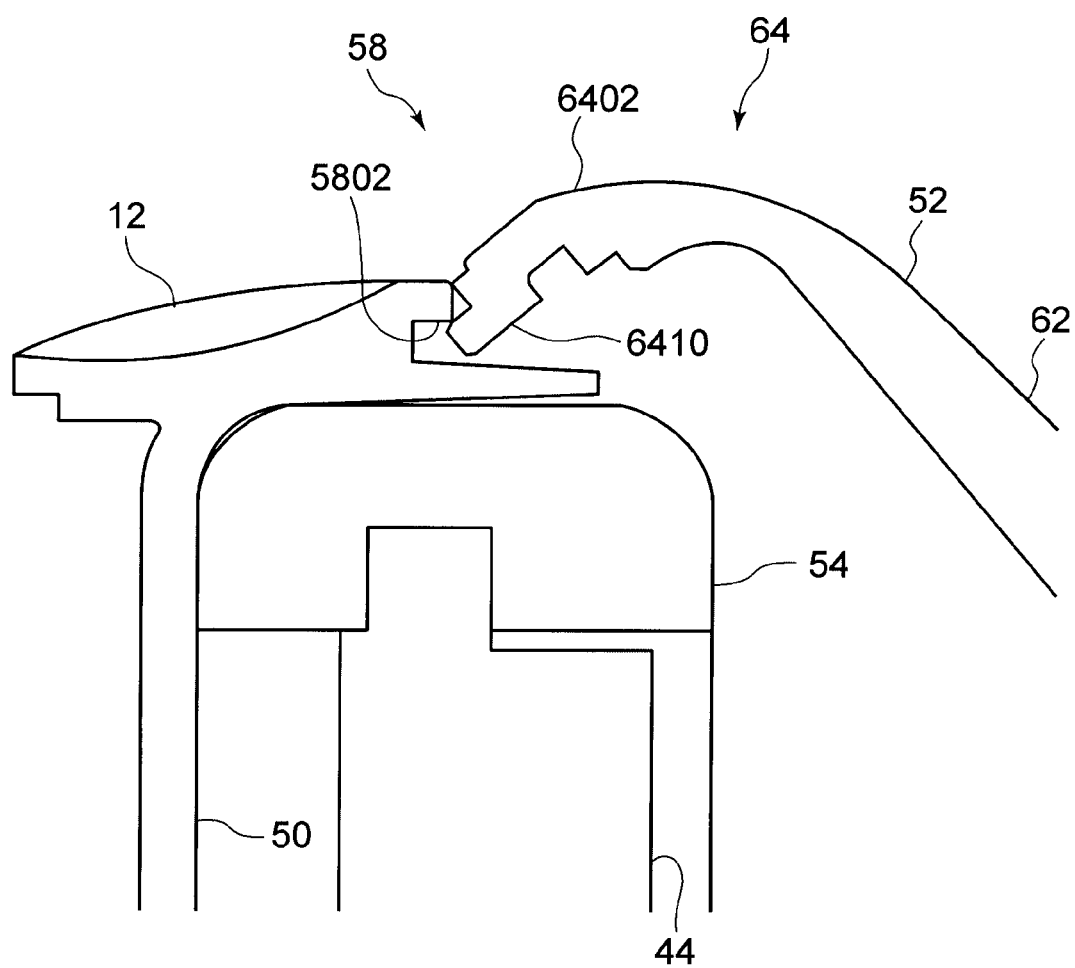
FIG. 17 is a diagram for explaining the mounting step of the cover at a section taken along line BB of FIG. 13.
Figure 18:
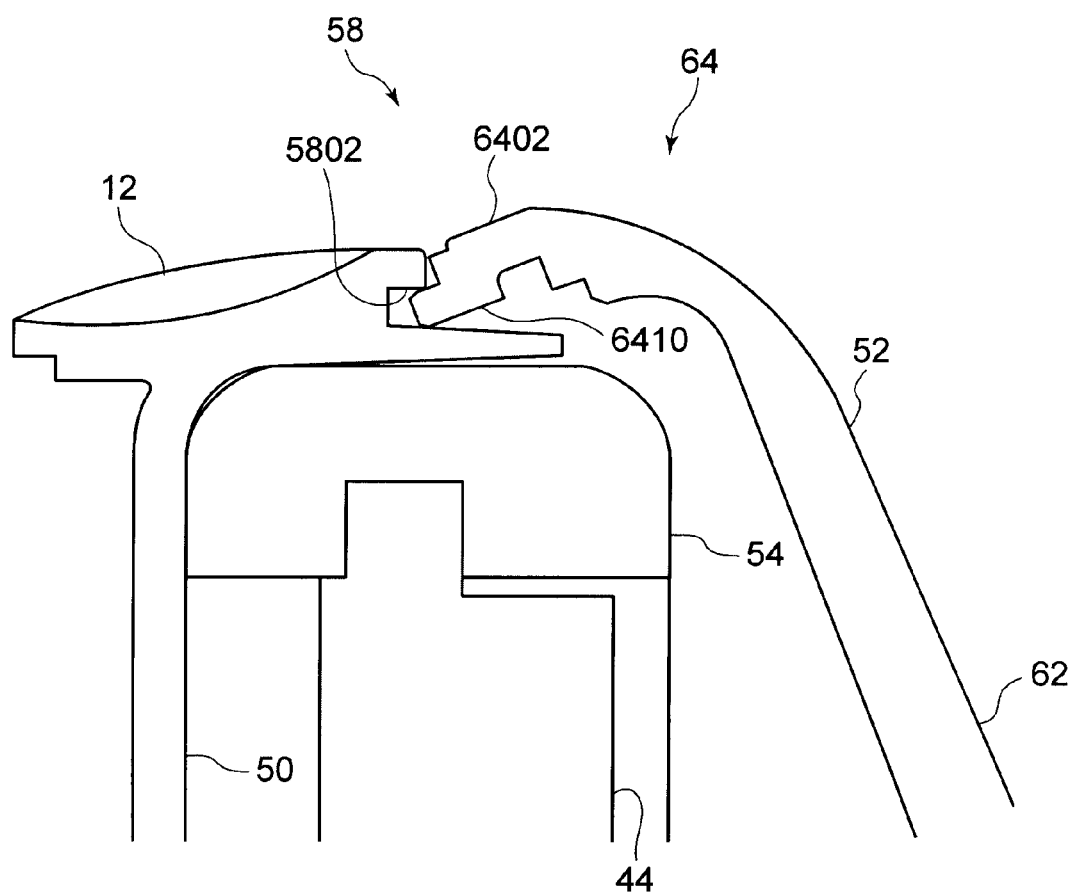
FIG. 18 is a diagram for explaining the mounting step of the cover at the section taken along line BB of FIG. 13.
Figure 19:
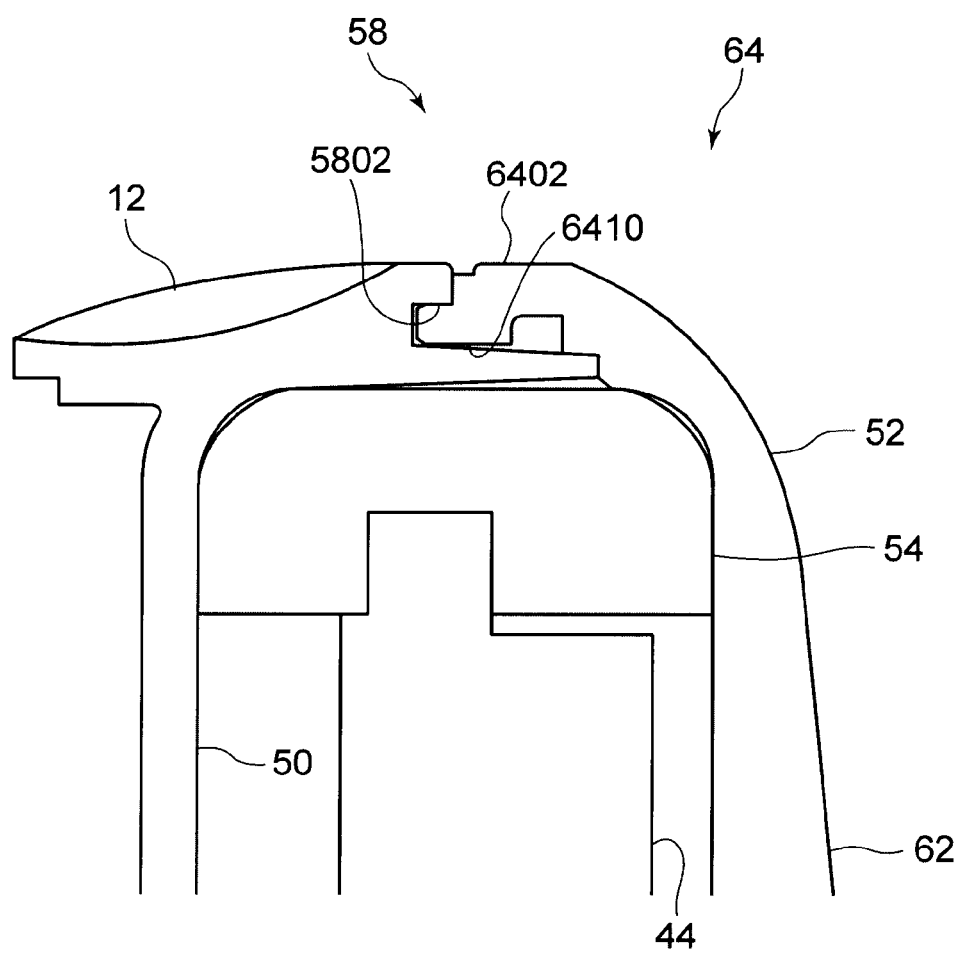
FIG. 19 is a diagram for explaining the mounting step of the cover at the section taken along line BB of FIG. 13.

FIG. 11 is a sectional view partly taken along line AA in FIG. 4, and FIG. 12 is a sectional view partly taken along line BB in FIG. 4. FIG. 13 is a right hand side view of the imaging apparatus 10. FIGS. 14 to 16 are diagrams for explaining a mounting step of a cover 52 at a section taken along line AA in FIG. 13. FIGS. 17 to 19 are diagrams for explaining a mounting step of the cover 52 at a section taken along line BB of FIG. 13. FIGS. 20 to 23 are diagrams for explaining a mounting step of the cover 52.

The right-hand side plane 12F of the exterior casing 12 is provided with a hard disk accommodation unit 50 and the cover 52 which opens and closes the hard disk accommodation unit 50. In a situation where the hard disk accommodation unit 50 is closed with the cover 52, an outer plane of the cover 52 constitutes a part of the right-hand side plane 12F (most part in the present embodiment).

As shown in FIG. 3, the hard disk drive 44 is arranged such that a magnetic disk, a magnetic head, etc. are incorporated into the inside of a hard disk casing 45. The hard disk casing 45 has a flat, rectangular, plate-like shape with a thickness smaller than height and width, and its circumference is provided with two dampers 54.

The hard disk accommodation unit 50 is formed to have a length, a width, and a thickness which are respectively larger in size than a length, a width, and a depth of the hard disk casing 45. In the present embodiment, it is formed to have a length, a width, and a depth in size which allow accommodation of the hard disk casing 45 with the dampers 54 being mounted.

The hard disk accommodation unit 50 is arranged such that one plane in the depth direction has a rectangular opening 56, and the hard disk drive 44 is attached and detached along the depth direction of the hard disk accommodation unit 50 through the opening 56 with the dampers 54 being mounted.

As shown in FIG. 3, a first casing-side engaging portion 58 is provided at a part of the exterior casing 12, which includes one of four edges which define the opening 56. In the present embodiment, such a portion is disposed at a part of the exterior casing 12 including an upper edge.

Further, a second casing-side engaging portion 60 is provided at a part of the exterior casing 12, which includes another edge opposite to one of the four edges which define the opening 56. In the present embodiment, such a portion is disposed at a part of the exterior casing 12 including a lower edge.

As shown in FIGS. 3, 11, and 12, the first casing-side engaging portion 58 is provided with a first engaging recess 5802 and a second engaging recess 5804.

The first engaging recess 5802 is provided in the middle of the upper edge which defines the upper part of the opening 56 and in its extending direction. As shown in FIG. 12, it has a depth in a direction in parallel with the depth direction of the hard disk accommodation unit 50, extends along an extending direction of the upper edge, and is formed to externally open outside the exterior casing 12.

As shown in FIG. 3, two second engaging recesses 5804 are provided such that the first engaging recess 5802 may be located therebetween in the extending direction of the upper edge which defines the upper part of the opening 56.

As shown in FIG. 11, each of the second engaging recesses 5804 has a depth in a direction perpendicular to the depth direction of the hard disk accommodation unit 50 (depth in a direction perpendicular to the extending direction of the upper edge of the opening 56 and in a direction toward the hard disk accommodation unit 50), and extends along the extending direction of the upper edge.

As shown in FIGS. 11 and 12, a flat outside portion 6002 which faces downward is formed at the second casing-side engaging portion 60. A plurality of screw holes (not shown in the figure) are formed at this outside portion 6002.

Further, in the present embodiment, screw holes (not shown in the figure) are respectively formed at the exterior casing 12 in the front of a front edge which defines a front portion of the opening 56 and at the exterior casing 12 behind a rear edge which defines a rear portion of the opening 56.

As shown in FIG. 3, the opening 56 is opened and closed with the cover 52. The cover 52 has a first cover-side engaging portion 64, a main plate portion 62, and a second cover-side engaging portion 66.

The main plate portion 62 has a rectangle with a size capable of closing the opening 56.

As shown in FIG. 1, screw insertion holes 6210 are formed at the front and rear of the main plate portion 62, respectively.

As shown in FIGS. 11 and 12, the first cover-side engaging portion 64 is connected or continuous with an upper side of the main plate portion 62 via a curved portion 63. The first cover-side engaging portion 64 projects in a direction crossing the main plate portion 62 (perpendicular direction in the present embodiment).

The inner plane and the outer plane of the curved portion 63 are formed to be a convex-like curve toward the outside of the hard disk accommodation unit 50 while the opening 56 is closed with the main plate portion 62, the first cover-side engaging portion 64 is set on the first casing-side engaging portion 58, and the second cover-side engaging portion 66 is set on the second casing-side engaging portion 60.

As shown in FIGS. 16 and 19, the first cover-side engaging portion 64 is arranged to include a first plate portion 6402 which extends over the whole length of the upper side of the main plate portion 62 in a direction perpendicular to the main plate portion 62. In other words, the first cover-side engaging portion 64 has the first plate portion 6402 perpendicular to the main plate portion 62 via the curved portion 63.

A first engaging projection 6410 and two second engaging projections 6412 are provided at the first cover-side engaging portion 64 (at the first plate portion 6402).

The first engaging projection 6410 projects in parallel with the depth direction of the hard disk accommodation unit 50 while the opening 56 is closed with the main plate portion 62, the first cover-side engaging portion 64 is set on the first casing-side engaging portion 58, and the second cover-side engaging portion 66 is set on the second casing-side engaging portion 60, and extends along an extending direction of the first plate portion 6402.

The first engaging projection 6410 is provided between the second engaging projections 6412 in the extending direction of the first plate portion 6402.

Each of the second engaging projections 6412 projects in a direction perpendicular to the depth direction of the hard disk accommodation unit 50 (in a direction perpendicular to the extending direction of the first plate portion 6402 and the direction toward the hard disk accommodation unit 50), and extends along the extending direction of the first plate portion 6402.

Then, as shown in FIG. 19, it is arranged that the first engaging projection 6410 engages with the first engaging recess 5802 while the opening 56 is closed with the main plate portion 62, and the first cover-side engaging portion 64 is set on the first casing-side engaging portion 58. As the first engaging projection 6410 engages with the first engaging recess 5802, the cover 52 is inhibited from moving in the direction perpendicular to the depth direction of the hard disk accommodation unit 50 (movement of the cover 52 in the direction perpendicular to the extending direction of the upper side of the main plate portion 62 and a direction away from or toward the hard disk accommodation unit 50). In other words, in the present embodiment, it is arranged that the cover 52 may be inhibited from moving in the up/down direction.

Further, as shown in FIG. 16, it is arranged that the two second engaging projections 6412 respectively engage with the corresponding second engaging recesses 5804 while the opening 56 is closed with the main plate portion 62 and the first cover-side engaging portion 64 is set on the first casing-side engaging portion 58. As the second engaging projections 6412 engage with the second engaging recesses 5804, the cover 52 is inhibited from moving in the direction in parallel with the depth direction of the hard disk accommodation unit 50. In other words, in the present embodiment, it is arranged that the cover 52 may be inhibited from moving in the right/left direction.

As shown in FIGS. 11 and 12, the second cover-side engaging portion 66 is connected or continuous with the main plate portion 62 via a curved portion 65, and projects in the direction crossing the main plate portion 62 (perpendicular direction in the present embodiment).

The inner plane and the outer plane of the curved portion 65 are formed to be a convex-like curve toward the outside of the hard disk accommodation unit 50 while the opening 56 is closed with the main plate portion 62, the first cover-side engaging portion 64 is set on the first casing-side engaging portion 58, and the second cover-side engaging portion 66 is set on the second casing-side engaging portion 60.

As shown in FIGS. 11 and 12, the second cover-side engaging portion 66 is arranged to include a second plate portion 6602 which extends over the whole length of the lower side of the main plate portion 62 in a direction perpendicular to the main plate portion 62.

The first cover-side engaging portion 64 and the second cover-side engaging portion 66 are opposite to each other, that is, the first plate portion 6402 and the second plate portion 6602 are facing to each other.

As shown in FIGS. 11 and 12, in a position where the second cover-side engaging portion 66 faces the second casing-side engaging portion 60, a flat inside portion 6610 is formed which can come into contact with the outside portion 6002 of the second casing-side engaging portion 60.

Figure 20:
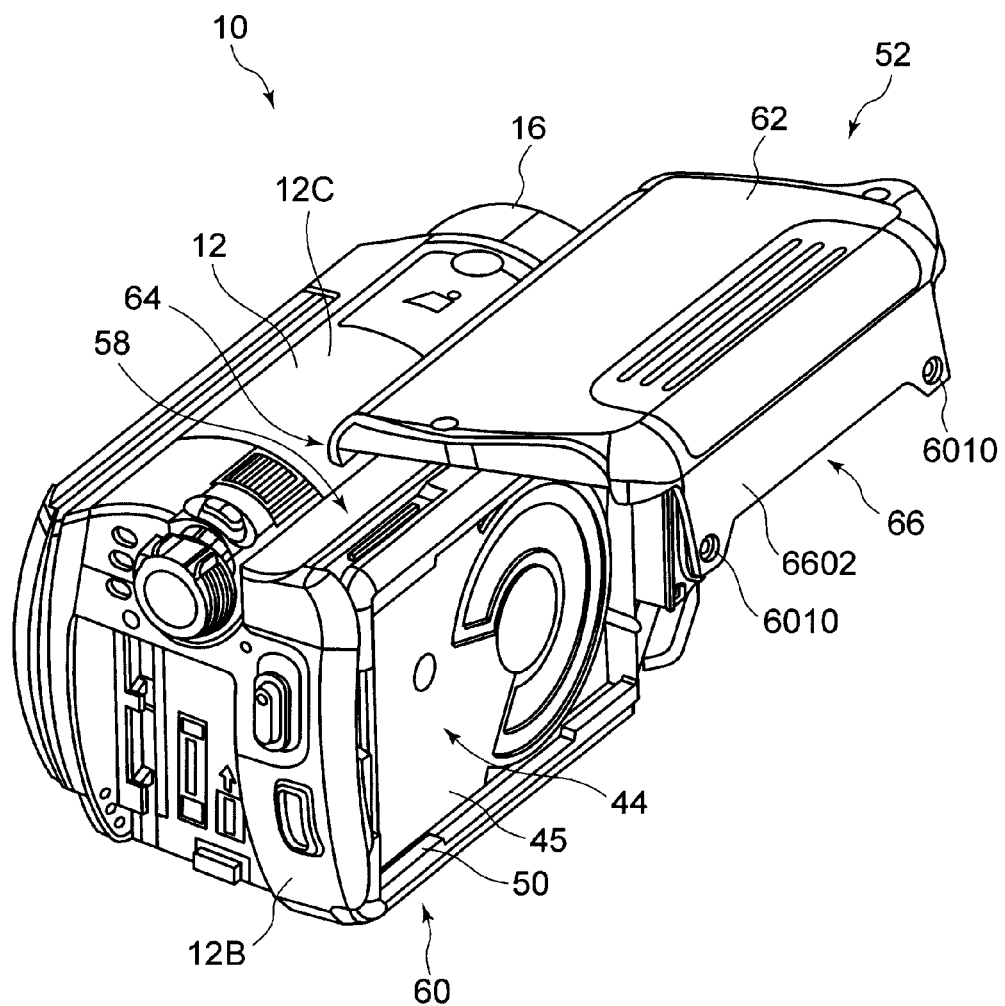
FIG. 20 is a diagram for explaining the mounting step of the cover.
Figure 21:
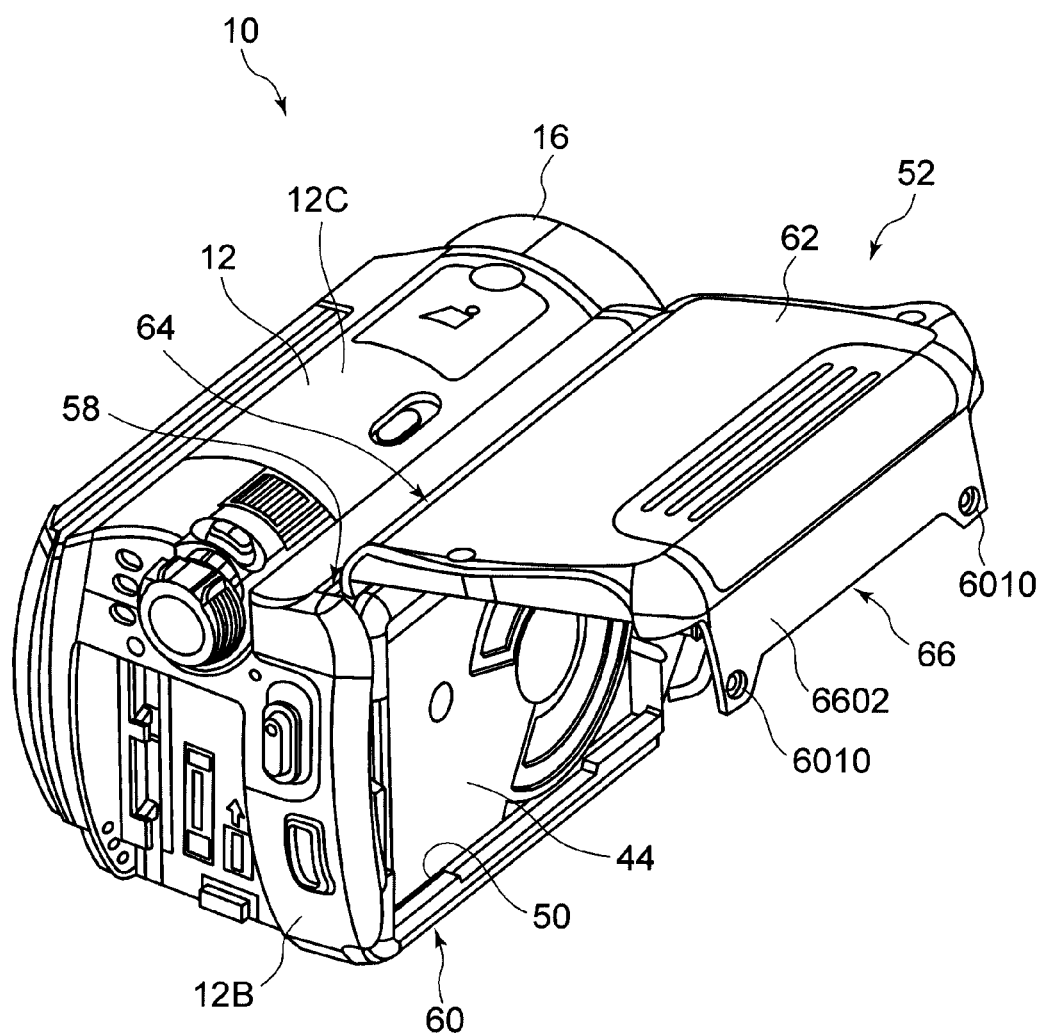
FIG. 21 is a diagram for explaining the mounting step of the cover.
Figure 22:
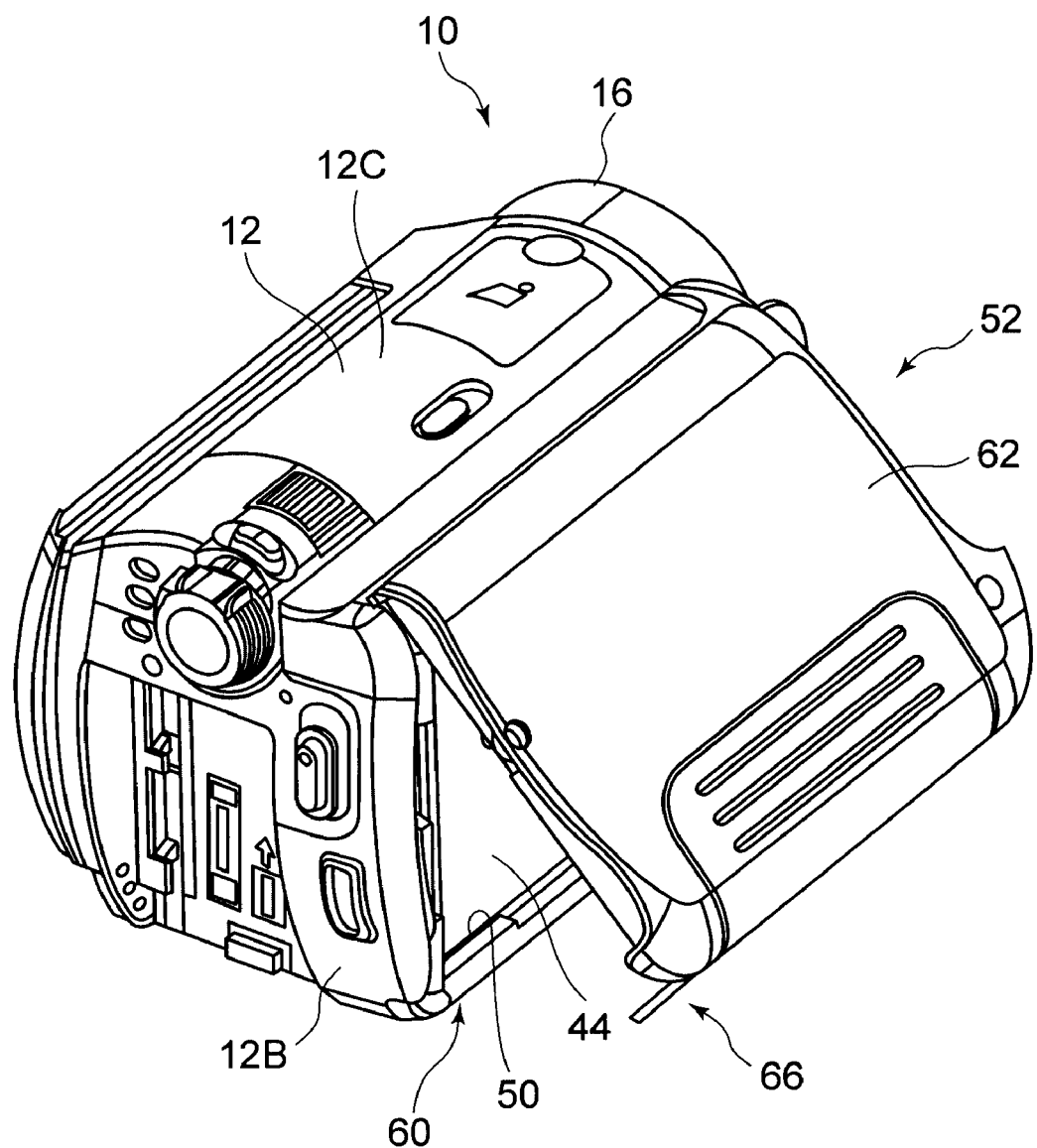
FIG. 22 is a diagram for explaining the mounting step of the cover.

As shown in FIG. 20, a plurality of screw insertion holes 6010 are formed at the second plate portion 6602 including the inside portion 6610 coaxially with the plurality of screw holes (not shown in the figure).

As shown in FIGS. 14 to 23, the opening 56 is closed with the main plate portion 62, the first and second engaging projections 6410 and 6412 are respectively inserted in the first and second engaging recesses 5802 and 5804, and the outside portion 6002 and the inside portion 6610 are brought into contact with each other, whereby the first cover-side engaging portion 64 is set on the first casing-side engaging portion 58, and the second cover-side engaging portion 66 is set on the second casing-side engaging portion 60.

Figure 23:
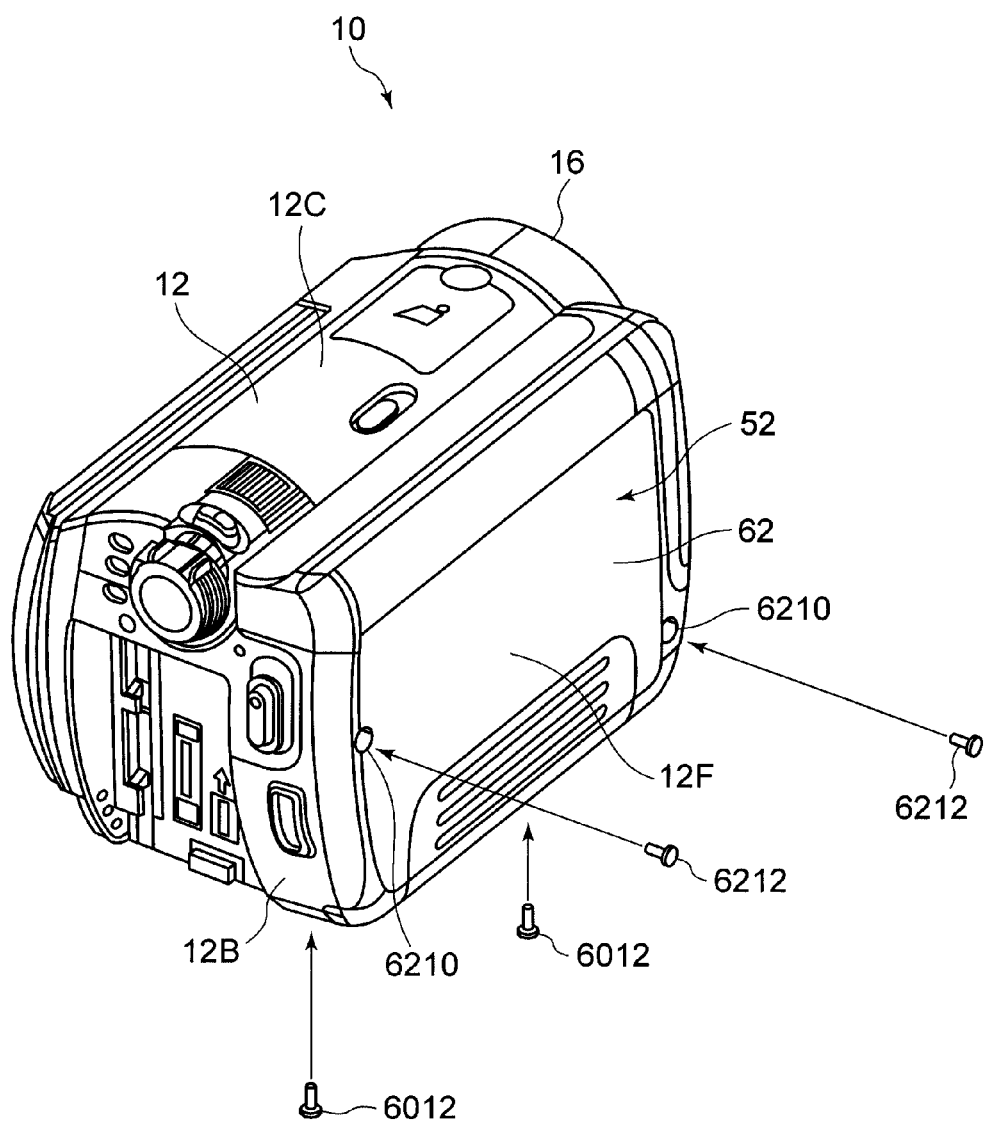
FIG. 23 is a diagram for explaining the mounting step of the cover.

Then, in this situation, as shown in FIG. 23, screws 6012 which threadedly engage with the screw holes through the screw insertion holes 6010 are fixed, and screws 6212 are engaged with the screw holes of the exterior casing 12 through the screw insertion holes 6210, such that the cover 52 is attached to the exterior casing 12 by means of these screws 6012 and 6022.

In the situation where the cover 52 is thus attached to the exterior casing 12, as shown in FIGS. 11 and 12, the outer plane of the first cover-side engaging portion 64 extends over a virtual plane continuous with an upper plane 12C of the exterior casing 12, and an outer plane of the second cover-side engaging portion 66 extends over a virtual plane continuous with the bottom plane 12D of the exterior casing 12. Therefore, the cover 52 constitutes not only part of the right-hand side plane 12F of the exterior casing 12 but also part of the upper plane 12C and the bottom plane 12D of the exterior casing 12.

Further, as shown in FIGS. 11 and 12, the damper 54 which is mounted at a position located near the first cover-side engaging portion 64 of the damper 54 (at an upper side of the hard disk casing 45 in the present embodiment) is sandwiched by the bottom of the hard disk accommodation unit 50 and a position located at an inner plane where the main plate portion 62 faces the hard disk accommodation unit 50 near the first cover-side engaging portion 64. Furthermore, the damper 54 which is mounted at a position located near the second cover-side engaging portion 66 of the damper 54 (at a lower side of the hard disk casing 45 in the present embodiment) is sandwiched by the bottom of the hard disk accommodation unit 50 and a position located at an inner plane where the main plate portion 62 faces the hard disk accommodation unit 50 near the second cover-side engaging portion 66. Since the damper 54 is sandwiched as mentioned above, the hard disk drive 44 is held and accommodated in the hard disk accommodation unit 50.

Further, a grip belt (not shown in the figure) is provided such that it may pass along the outside of the right-hand side plane 12F of the exterior casing 12 (the grip belt is provided such that it may pass along the outside of the cover 52 in the present embodiment), a front end and a rear end of the grip belt are respectively attached to the front plane 12A and the rear plane 12B of the exterior casing 12, and a right hand insertion space is formed between the cover 52 and the grip belt. Therefore, a user of the imaging apparatus 10 inserts his or her right hand between the cover 52 and the grip belt, and holds the cover 52 and portions located above and under this cover 52 to carry out imaging.

According to the imaging apparatus 10 of the present embodiment, the first and second engaging projections 6410 and 6412 of the cover 52 are respectively engaged with the first and second engaging recesses 5802 and 5804 of the exterior casing 12, and the outside portion 6002 and the inside portion 6610 are brought into contact with each other, whereby the cover 52 is attached to the exterior casing 12. Thus, it is possible to inhibit the cover 52 from moving in the up/down direction and in the left/right direction without providing additional components required to attach the cover 52 in the structure using typical hinge and lock mechanism of related art. Therefore, it is advantageous in reducing the number of assemblies, reducing costs, and miniaturizing.

Further, since the first and second engaging projections 6410 and 6412 of the cover 52 are respectively engaged with the first and second engaging recesses 5802 and 5804 of the exterior casing 12, the cover 52 is inhibited from moving either in the left/right direction or the up/down direction.

Especially, in the present embodiment, the cover 52 constitutes the right-hand side plane 12F of the exterior casing 12, and is the portion to be held in use of the imaging apparatus 10, such that the cover 52 is certainly prevented from rattling when it is held by hand, and it is advantageous to improve the operability of the imaging apparatus 10.

Further, in the present embodiment, since two pairs of second engaging projections 6412 and second engaging recesses 5804 are provided at two positions between which a pair of first engaging projection 6410 and first engaging recess 5802 are located and which are in the extending direction of the upper edge which defines the opening 56, it is possible to certainly inhibit the cover 52 from moving in the left/right direction, and the cover 52 is prevented more certainly from rattling when a portion of the cover 52 is held by hand, thus being advantageous in improving the operability of the imaging apparatus 10.

Further, since the hard disk accommodation unit 50 is provided at the side of the exterior casing 12 and the cover 52 for opening and closing this hard disk accommodation unit 50 is provided, it is possible to install the hard disk drive 44 at the final stage in the assembly. Therefore, although there is a possibility that a magnetic disk and a magnetic head inside the hard disk drive 44 may collide with each other, and may be damaged when a strong shock and vibration are applied, it is advantageous to avoid the above-mentioned possibility since the hard disk drive 44 is installed at the final stage according to the present embodiment.

Furthermore, since the hard disk accommodation unit 50 is provided at the side of the exterior casing 12 and the cover 52 for opening and closing this hard disk accommodation unit 50 is provided, only the hard disk drive 44 can be easily attached to and detached from the electronic device. Therefore, there is provided an effect that those hard disk drives 44 can easily be replaced or repaired when the hard disk drive 44 is replaced with another hard disk drive 44 having a larger data capacity after purchase or when fixing (or performing maintenance of) the hard disk drive 44.

Still further, since the hard disk drive 44 is provided at the right-hand side plane 12F of the exterior casing 12 through the hard disk accommodation unit 50, it is possible to arrange a heat source which emits heat, such as the imaging element 18 and the display panel 20, at a position away from the hard disk drive 44 (for example, at a position near the left-hand side plane). Such an arrangement is advantageous in raising operational stability of the hard disk drive 44 and prolonging a life.

In addition, in the present embodiment, a case is described where the first engaging projection 6410 is provided at the cover 52, the first engaging recess 5802 is provided at the exterior casing 12, the second engaging projection 6412 is provided at the cover 52, and the second engaging recess 5804 is provided at the exterior casing 12. However, the first engaging projection 6410 may be provided at either the cover 52 or the exterior casing 12, and the first engaging recess 5802 may be provided at the other. Although the second engaging projection 6412 may be provided at either the cover 52 or the exterior casing 12 and the second engaging recess 5804 may be provided at the other, the arrangement as in the embodiment is advantageous in reducing the size of device.

Further, in the present embodiment, although the case where the electronic device is the imaging apparatus 10 is described, the present invention is not limited to the imaging apparatus and can be widely applied to various electronic devices having a hard disk drive.

The present application contains subject matters related to Japanese Patent Application No. 2006-159659 filed in Japanese Patent Office on Jun. 8, 2006, the entire content of which being incorporated herein by reference.

It should be understood by those skilled in the art that various modifications, combinations, sub-combinations, and alterations may occur depending on design requirements and other factors insofar as they are within the scope of appended claims and equivalents thereof.

What is claimed is:

1. An electronic device having an exterior casing and a flat hard disk drive with a thickness smaller than height and width, wherein
the exterior casing is provided with
a hard disk accommodation unit which has a depth corresponding to the thickness and in which the hard disk drive is accommodated,
an opening through which the hard disk drive is detachably mounted along the depth direction of the hard disk accommodation unit, and
a cover for opening and closing the opening,
either the cover or the exterior casing is provided with a first engaging projection which projects in parallel with the depth direction of the hard disk accommodation unit while the opening is closed with the cover, and the other is provided with a first engaging recess which engages with the first engaging projection and prevents the cover from moving in a direction perpendicular to the depth direction of the hard disk accommodation unit while the opening is closed with the cover,
either the cover or the exterior casing is provided with a second engaging projection which projects in a direction perpendicular to the depth direction of the hard disk accommodation unit, and the other is provided with a second engaging recess which engages with the second engaging projection and prevents the cover from moving in a direction in parallel with the depth direction of the hard disk accommodation unit while the opening is closed with the cover.

2. The electronic device according to claim 1, wherein
the opening is rectangular,
the cover is provided with a rectangle main plate portion with a size capable of closing the opening, and a first cover-side engaging portion which is connected with one of four sides of the main plate portion and projects in a direction crossing the main plate portion,
the exterior casing is provided with a first casing-side engaging portion on which the first cover-side engaging portion is set while the opening is closed with the main plate portion,
either the first engaging projection or the first engaging recess is provided at the first cover-side engaging portion, and the other is provided at the first casing-side engaging portion, and
either the second engaging projection or the second engaging recess is provided at the first cover-side engaging portion, and the other is provided at the first casing-side engaging portion.

3. An electronic device having an exterior casing and a flat hard disk drive with a thickness smaller than height and width, wherein
the exterior casing is provided with a hard disk accommodation unit which has a depth corresponding to the thickness and in which the hard disk drive is accommodated, an opening through which the hard disk drive is detachably mounted along the depth direction of the hard disk accommodation unit, and a cover for opening and closing the opening,
the cover is provided with a first engaging projection which projects in parallel with the depth direction of the hard disk accommodation unit while the opening is closed with the cover, and a second engaging projection which projects in a direction perpendicular to the depth direction of the hard disk accommodation unit, and
the exterior casing is provided with a first engaging recess which engages with the first engaging projection and prevents the cover from moving in a direction perpendicular to the depth direction of the hard disk accommodation unit while the opening is closed with the cover, and a second engaging recess which engages with the second engaging projection and prevents the cover from moving in a direction in parallel with the depth direction of the hard disk accommodation unit.

4. The electronic device according to claim 3, wherein
the opening is rectangular,
the cover is provided with a rectangle main plate portion with a size capable of closing the opening, and a first cover-side engaging portion which is connected with one of four sides of the main plate portion and projects in a direction crossing the main plate portion,
the exterior casing is provided with a first casing-side engaging portion on which the first cover-side engaging portion is set while the opening is closed with the main plate portion, and
the first engaging projection and the second engaging projection are provided at the first cover-side engaging portion, and the first engaging recess and the second engaging recess are provided at the first casing-side engaging portion.

5. The electronic device according to claim 2 or 4, wherein
the first cover-side engaging portion is connected with the main plate portion via a curved portion,
an inner plane where the curved portion faces the hard disk accommodation unit and an outer plane which is a plane opposite to the inner plane are each formed to be a convex-like curve toward the outside of the hard disk accommodation unit while the opening is closed with the main plate portion and the first cover-side engaging portion is set on the first casing-side engaging portion.

6. The electronic device according to claim 2 or 4, wherein
the first cover-side engaging portion is arranged to include a first plate portion which extends over a whole length of one of the sides, and extends in a direction perpendicular to the main plate portion.

7. The electronic device according to claim 2 or 4, wherein
one of the first engaging projection is provided, and
two of the second engaging projections are provided such that the first engaging projection may be located therebetween in an extending direction perpendicular to the main plate portion.

8. The electronic device according to claim 2 or 4, wherein
the opening is closed with the main plate portion, and the cover is attached to the exterior casing with a screw inserted into a screw insertion hole of the main plate portion while the first cover-side engaging portion is set on the first casing-side engaging portion.

9. The electronic device according to claim 2 or 4, wherein
the cover is provided with a second cover-side engaging portion which is connected with another side opposite to the one of four sides of the main plate portion and projects in a direction crossing the main plate portion,
the exterior casing is provided with a second casing-side engaging portion on which the second cover-side engaging portion is set while the opening is closed with the main plate portion, and
the first cover-side engaging portion and the second cover-side engaging portion are facing to each other.

10. The electronic device according to claim 9, wherein
the second cover-side engaging portion is connected with the main plate portion via a curved portion,
an inner plane where the curved portion faces the hard disk accommodation unit and an outer plane which is a plane opposite to the inner plane are each formed to be a convex-like curve toward the outside of the hard disk accommodation unit while the opening is closed with the main plate portion and the second cover-side engaging portion is set on the second casing-side engaging portion.

11. The electronic device according to claim 9, wherein the second cover-side engaging portion includes a second plate portion which extends in the direction perpendicular to the main plate portion and extends along the another side.

12. The electronic device according to claim 11, wherein the second cover-side engaging portion is such that an outside portion provided at the second casing-side engaging portion is set on an inside portion provided at the second plate portion while the opening is closed with the main plate portion and the second cover-side engaging portion is set on the second casing-side engaging portion, and
the cover is attached to the exterior casing by means of a screw inserted into a screw insertion hole while the opening is closed with the main plate portion, the first cover-side engaging portion is set on the first casing-side engaging portion, and the second cover-side engaging portion is set on the second casing-side engaging portion.

13. The electronic device according to claim 12, wherein the hard disk drive is accommodated in the hard disk accommodation unit with a damper being mounted on a circumference of the drive,
a position located near the first cover-side engaging portion at the damper is sandwiched by a bottom of the hard disk accommodation unit and a position located at an inner plane where the main plate portion faces the hard disk accommodation unit near the first cover-side engaging portion, and a position located near the second cover-side engaging portion at the damper is sandwiched by the bottom of the hard disk accommodation unit and a position located at an inner plane where the main plate portion faces the hard disk accommodation unit near the second cover-side engaging portion, while the opening is closed with the main plate portion, the first cover-side engaging portion is set on the first casing-side engaging portion, the second cover-side engaging portion is set on the second casing-side engaging portion, and the cover is attached to the exterior casing by means of the screw passing through the screw insertion hole and being threadedly engaged with the screw hole.

14. The electronic device according to claim 9, wherein the exterior casing has an upper plane which faces upward, a bottom plane which faces downward, and a side plane which faces laterally,
the hard disk accommodation unit is provided at the side plane,
an outer plane of the main plate portion located opposite the opening constitutes a part of the side plane, an outer plane of the first cover-side engaging portion located opposite the first casing-side engaging portion constitutes a part of the upper plane, and an outer plane of the second cover-side engaging portion located opposite the second casing-side engaging portion constitutes a part of the bottom plane, while the opening is closed with the main plate portion, the first cover-side engaging portion is set on the first casing-side engaging portion, and the second cover-side engaging portion is set on the second casing-side engaging portion.

15. The electronic device according to claim 14, wherein the outer plane of the first cover-side engaging portion extends over a virtual plane continuous with the upper plane, and the outer plane of the second cover-side engaging portion extends over a virtual plane continuous with the bottom plane.

16. The electronic device according to claim 1 or 3, wherein the cover is made of a synthetic resin and integrally molded by means of a mold.

17. The electronic device according to claim 1 or 3, the electronic device being an imaging apparatus and comprising an imaging optical system accommodated in the exterior casing, an imaging element for taking an object image derived by the imaging optical system, and a signal processing unit for recording image data generated based on an image signal generated by the imaging element on the hard disk drive.

18. The electronic device according to claim 1 or 3, the electronic device being an imaging apparatus and comprising an imaging optical system accommodated in the exterior casing, an imaging element for taking an object image derived by the imaging optical system, and a signal processing unit for recording image data generated based on an image signal generated by the imaging element on the hard disk drive, wherein the exterior casing has a front plane which faces forward, an upper plane which faces upward, a bottom plane which faces downward, and a side plane which faces laterally,
the imaging optical system is provided such that it may face forward from the front plane,
the hard disk accommodation unit is provided at the side plane,
the cover constitutes the side plane,
a grip belt is provided over the front and the rear of the exterior casing passing through the side plane laterally, and
a hand is inserted between the side plane and the grip belt to hold a part of the exterior casing including the side plane.

* * * * *